(12) United States Patent
Mucha et al.

(10) Patent No.: US 12,449,426 B2
(45) Date of Patent: Oct. 21, 2025

(54) METHOD OF SCREENING FOR A CHRONIC KIDNEY DISEASE OR GLOMERULOPATHY METHOD OF MONITORING A RESPONSE TO TREATMENT OF A CHRONIC KIDNEY DISEASE OR GLOMERULOPATHY IN A SUBJECT AND A METHOD OF TREATMENT OF A CHRONIC KIDNEY DISEASE OR GLOMERULOPATHY

(71) Applicants: WARSZAWSKI UNIWERSYTET MEDYCZNY, Warsaw (PL); INSTYTUT BIOCHEMII I BIOFIZYKI PAN, Warsaw (PL)

(72) Inventors: Krzysztof Mucha, Warsaw (PL); Radoslaw Zagozdzon, Truskaw (PL); Bartosz Foroncewicz, Warsaw (PL); Leszek Paczek, Warsaw (PL); Barbara Moszczuk, Warsaw (PL); Natalia Krata, Rzeszow (PL); Dominik Cysewski, Warsaw (PL); Dominik Domanski, Warsaw (PL); Michal Dadlez, Warsaw (PL); Michal Burdukiewicz, Wroclaw (PL)

(73) Assignees: WARSZAWSKI UNIWERSYTET MEDYCZNY, Warsaw (PL); INSTYTUT BIOCHEMII I BIOFIZYKI PAN, Warsaw (PL)

( * ) Notice: Subject to any disclaimer, the term of this patent is extended or adjusted under 35 U.S.C. 154(b) by 714 days.

(21) Appl. No.: 17/906,922

(22) PCT Filed: Nov. 10, 2020

(86) PCT No.: PCT/IB2020/060568
§ 371 (c)(1),
(2) Date: Sep. 21, 2022

(87) PCT Pub. No.: WO2021/152370
PCT Pub. Date: Aug. 5, 2021

(65) Prior Publication Data
US 2023/0137242 A1     May 4, 2023

(30) Foreign Application Priority Data
Jan. 31, 2020 (PL) .......................... 432778

(51) Int. Cl.
*G01N 33/68*     (2006.01)

(52) U.S. Cl.
CPC . *G01N 33/6893* (2013.01); *G01N 2333/4728* (2013.01); *G01N 2333/765* (2013.01);
(Continued)

(58) Field of Classification Search
CPC ..... G01N 2333/4728; G01N 2333/765; G01N 2333/79; G01N 2333/8125; G01N 2800/347; G01N 33/6854; G01N 33/6893
See application file for complete search history.

(56) References Cited

U.S. PATENT DOCUMENTS

| | | |
|---|---|---|
| 8,927,220 B2 | 1/2015 | Baek |
| 2012/0178642 A1 | 7/2012 | Salomon et al. |

(Continued)

FOREIGN PATENT DOCUMENTS

| | | |
|---|---|---|
| WO | 2003002757 A1 | 1/2003 |
| WO | 2011035323 A1 | 3/2011 |

(Continued)

OTHER PUBLICATIONS

Magda Bakun et al: "Urine proteome of autosomal dominant polycystic kidney disease patients", Clinical Proteomics, Biomed Central Ltd, London, UK, vol. 9, No. 1, pp. 1-13, Dec. 11, 2012.
(Continued)

*Primary Examiner* — Jennifer Wecker
(74) *Attorney, Agent, or Firm* — FISHERBROYLES, LLP; Roger L. Browdy

(57) ABSTRACT

The object of the present invention is a method of diagnosis of a chronic kidney disease (CKD) or glomerulopathy in a subject, comprising the following steps: (a) determination of the level of at least three or four or five protein markers selected from the group consisting of serum albumin (ALB), alpha-1-antitrypsin (serpinal), alpha-1-acid glycoprotein 1
(Continued)

(ORM1), serotransferrin (TF) and trefoil factor 1 (TFF), wherein said markers also comprise the non-full-length fragments thereof, in a urine sample from said subject and (b) assigning a probability of the subject having or being at a risk of chronic kidney disease or glomerulopathy or not having nor being at a risk thereof based on the results of the assay of step (a), wherein this involves estimating a probability of the subject having or being at a risk of chronic kidney disease or glomerulopathy or not having nor being at a risk thereof based on the level of each of the marker levels determined in (a)), the probability being estimated based on the levels of each of the markers as determined in subjects known to suffer from a glomerulopathy or a chronic kidney disease; and determining the probability of the subject, providing the urine sample tested in step (a), having or being at a risk of a glomerulopathy or a chronic kidney disease or not having nor being at a risk thereof as a product of the corresponding probabilities obtained from each marker. A further object of the present invention is a method of monitoring a response to treatment of a chronic kidney disease (CKD) or glomerulopathy in a subject, comprising the following steps: a) measurement of the level, at a first point in time, for three or four or five of the markers selected from a group consisting of serum albumin (ALB), alpha-1-antitrypsin (serpinal), alpha-1-acid glycoprotein 1 (ORM1), serotransferrin (TF) and trefoil factor 1 (TFF), wherein said markers also comprise the non-full-length fragments thereof, in a urine sample from a subject; b) repeating the assay of step (a) at a later point in time after a period wherein the subject was undergoing a treatment; c) assessing a response to said treatment by comparing the results of the assays of steps (a) and (b), wherein lower marker levels after treatment are indicative of a positive response to treatment. A further object of the present invention is a method of treatment of a chronic kidney disease (CKD) or glomerulopathy in a subject, comprising the following steps: (a) determination of the level of at least three or four or five protein markers selected from the group consisting of serum albumin (ALB), alpha-1-antitrypsin (serpinal), alpha-1-acid glycoprotein 1 (ORM1), serotransferrin (TF) and trefoil factor 1 (TFF), wherein said markers also comprise the non-full-length fragments thereof, in a urine sample from said subject and (b) assigning a probability of the subject having or being at a risk of chronic kidney disease or glomerulopathy based on the results of the assay of step (a); (c) administering treatment against a chronic kidney disease (CKD) or glomerulopathy in the subject evaluated in step (b) as having or being at a risk of chronic kidney disease or glomerulopathy.

11 Claims, 12 Drawing Sheets

(52) U.S. Cl.
CPC . *G01N 2333/79* (2013.01); *G01N 2333/8125* (2013.01); *G01N 2800/347* (2013.01)

(56) References Cited

U.S. PATENT DOCUMENTS

| | | | |
|---|---|---|---|
| 2014/0038203 A1* | 2/2014 | Arthur | G01N 33/6893 435/7.1 |
| 2014/0235503 A1 | 8/2014 | Kim et al. | |
| 2016/0061845 A1 | 3/2016 | Bennett et al. | |
| 2017/0115310 A1* | 4/2017 | Colhoun | G16H 50/30 |

FOREIGN PATENT DOCUMENTS

| | | |
|---|---|---|
| WO | 2013152989 A2 | 10/2013 |
| WO | 2017212463 A1 | 12/2017 |

OTHER PUBLICATIONS

Mucha K, et al. Complement components, proteolysis- and cell communication-related proteins detected in the urine proteomics are associated with IgA nephropathy. Pol Arch Med Wewn. 2014, 124(7-8): pp. 380-386.
Gillette MA; Carr SA. "Quantitative analysis of peptides and proteins in biomedicine by targeted mass spectrometry" Nat. Methods 2013; 10 (1): 28-3.
Domański D et al., "MRM-based multiplexed quantitation of 67 putative cardiovascular disease biomarkers in human plasma" Proteomics. 2012; 12(8): 1222-43.
Chen YT, Chen HW, Domański D et al. Multiplexed quantification of 63 proteins in human urine by multiple reaction monitoring-based mass spectrometry for discovery of potential bladder cancer biomarkers. J Proteomics. 2012; 75: pp. 3529-3245.
Garcia-Bailo B et al. Dietary patterns and ethnicity are associated with distinct plasma proteomic groups. Am J Clin Nutr. 2012; 95(2): 352-61).
Nature Methods "Method of the Year" article (Vivien M. Targeted proteomics. Nature Methods. 2013; 10 (1): pp. 19-22).
Percy AJ, Chambers AG, Yang J, Hardie DB, Borchers CH. Advances in multiplexed MRM-based protein biomarker quantitation toward clinical utility, Biochim Biophys Acta. 2014; 1844: pp. 917-926).

\* cited by examiner

METHOD OF SCREENING FOR A CHRONIC KIDNEY DISEASE OR GLOMERULOPATHY METHOD OF MONITORING A RESPONSE TO TREATMENT OF A CHRONIC KIDNEY DISEASE OR GLOMERULOPATHY IN A SUBJECT AND A METHOD OF TREATMENT OF A CHRONIC KIDNEY DISEASE OR GLOMERULOPATHY

TECHNICAL FIELD

The object of the present invention is a method of diagnosis of a chronic kidney disease (CKD) or glomerulopathy. The present invention further relates to a method of monitoring response to treatment against a chronic kidney disease (CKD) or glomerulopathy. The present invention further relates to a method of treatment of a chronic kidney disease or glomerulopathy.

BACKGROUND ART

Chronic Kidney Disease (CKD) affects >10% of the world's population and glomerulopathies are a leading cause of CKD. The prevalence of CKD is different worldwide, up to 14.2% in the USA, 10.2% in Norway, and 11.9% in Poland. Increasing prevalence of end-stage renal disease (ESRD) requiring dialysis or kidney transplantation, represents a global public health problem. ESRD is associated with high morbidity and mortality and renal replacement therapies represent a costly burden for health care systems. It is estimated that over 4 million people in Poland suffer from CKD and the number of patients with ESRD on dialysis in Poland exceeds 19 000, in addition to 18 000 renal transplant recipients. Both early stages of CKD and ESRD are associated with high morbidity and increased healthcare utilization. Therefore, the IgAN—the most common primary glomerulonephritis worldwide, MN—one of the most common reason of nephrotic syndrome and LN—one of the most common secondary glomerulopathy, are the focus of attention of researchers, clinicians and healthcare providers.

Most forms of glomerulopathy can progress to CKD, especially if not treated early when the disease process is most active. Acquiring knowledge on the pathophysiology of glomerular diseases is an important step enabling development of new diagnosis and treatment tools.

IgA nephropathy (IgAN) is the most common primary glomerular kidney disease (20%) that frequently leads to ESRD, yet its aetiology remains poorly understood. The disease typically presents in the 2nd-4th decade of life. The individuals affected by IgAN develop characteristic IgA-containing antibody complexes that deposit in the kidney producing tissue injury. Kidney biopsy with histopathologic evaluation is the best available method to diagnose IgAN. IgAN is a genetically complex trait, and not much is known about its pathogenesis and pathophysiology. Therefore, treatment options are presently limited and mostly empiric. A pressing need exists for personalizing the medical care and finding new molecularly targeted therapies in these diseases.

Membranous nephropathy (MN) is one of the main causes of nephrotic syndrome, affecting mostly people between ages of 30 and 50 years. Recent years brought a huge progress in the field of non-invasive diagnostics, mainly due to the PLA2R antibody use in diagnostics and follow-up of primary MN. However, our understanding of MN is far from complete, especially that PLA2R-antibodies are found only in approximately 60-70% of all cases.

Lupus nephritis (LN) is a result of Systemic Lupus Erythematosus (SLE) and is said to be secondary and has a different pattern and outcome from conditions with a primary cause originating in the kidney.

The symptoms of all above mentioned glomerulopathies are highly variable including e.g. erythrocyturia, hematuria, proteinuria of different levels or progressive loss of renal function. Additional problems in diagnostics are caused by various distracting factors. For example, for a patient over 65, proteinuria in a non-nephrotic range may actually have other causes, such as vasculitis. Currently, kidney biopsy is the only way to make the diagnosis. However, this procedure is markedly invasive and may frequently cause adverse effects and in severe cases even result in patient's death. About 5-10% of patients still have inconclusive results even after biopsy. Furthermore, in about ⅓ of MN cases, an idiopathic remission occurs after some period of time. Therefore, there is a pressing need for a diagnostic method that would be quicker, easier, more reliable and less invasive.

One other possible diagnostic tool is determination of glomerular filtration rate. It is however not an efficient prognostic tool, since by itself it cannot provide an early answer as to how quickly a patient's condition may deteriorate.

Additionally, there is no readily available method of monitoring a patient's condition and/or monitoring response to treatment over time.

All of glomerular diseases are highly heterogeneous and genetically complex. Genome-wide association and linkage studies described, e.g. in IgAN, several susceptibility loci. However, the protein expression and production are most directly associated with pathophysiology of the certain disease. Genetic studies of IgAN have provided a glimpse into pathogenesis and identified molecular candidates for disease (Kiryluk K, Novak J, Gharavi A G. Pathogenesis of immunoglobulin A nephropathy: recent insight from genetic studies. Ann Rev Med. 2013; 64: 339-356). Kiryluk et al., also in collaboration with the inventors of the present application, has recently completed and published (Gharavi A G, Kiryluk K, Choi M, et al. Genome-wide association study identifies susceptibility loci for IgA nephropathy. Nat Genet. 2011; 43: 321-327) a genome-wide association study (GWAS) of IgAN in 20,650 individuals. In this large international study, 15 inherited genetic factors were identified that were strongly associated with the disease risk. The worldwide distribution of these factors closely paralleled the variation in IgAN occurrence across continents. Moreover, individuals who were born with a greater number of risk alleles had an earlier onset of kidney disease and were at a higher lifetime risk of developing ESRD. Additionally, their findings identified genetic defects in the immune system that are responsible for defence against mucosal infections, thus are central to the disease progression.

Despite the extensive datasets provided by genetic approaches, the information related to proteins is much closer to the functional changes that occur in pathophysiology of IgAN, MN and other glomerulopathies. These genetic findings need to be linked to the protein level of changes and to the clinical course of the disease. One of the most promising diagnostic tools is urine proteomics, particularly because the biological material can be obtained easily and comes directly from the diseased organ, the kidney. Indeed, it was previously reported that the presence of urinary proteins is indicative of glomerular damage and interstitial fibrosis.

Therefore, in parallel to the genetic studies, for the last several years the present inventors have participated in proteomic analysis of urine, also from IgAN patients (Mucha K, Bakun M, Jaźwiec R, et al. Complement components, proteolysis- and cell communication-related proteins detected in the urine proteomics are associated with IgA nephropathy. Pol Arch Med Wewn. 2014,124(7-8): 380-6).

During the last decade several studies that link proteomics and IgAN were published and range pallet of urine proteins considered to be specific for IgAN were proposed. However, methodological differences in urine collection and processing, small sample size, and patient heterogeneity, might have biased many of these studies.

Currently, the -omics approaches are considered to be one of the most promising methods for describing the pathophysiology of diseases. In a proteomic study workflow, proteins identified in global-type discovery experiments (e.g., label-free, iTRAQ or TMT) need to be verified by methods capable of accurate quantitation and high sensitivity. Also, targeted proteomics has an excellent potential to replace classical immunochemical methods in many diagnostic usages. One of the approaches in the analysis of biological samples is using multiplexed peptide panels with targeted mass spectrometry-based methods (multiple reaction monitoring (MRM)) and parallel reaction monitoring (PRM)) for the accurate and sensitive quantitation of specific proteins. In the last few years, there has been a significant increase in demand for service using targeted MS methods such as MRM and PRM assays for biomarker verification and validation, and when a highly sensitive and accurate protein measurement is required in hypothesis-driven experiments. Compared to antibody-based assays these methods, combined with stable-isotope-labelled standard peptides, are characterized by higher analytical specificity, higher precision, a wider dynamic range, and the possibility of measuring numerous proteins within a single rapid analysis in large sample sets (Gillette M A; Carr S A. Quantitative analysis of peptides and proteins in biomedicine by targeted mass spectrometry. Nat. Methods 2013; 10 (1): 28-34; Domański D et al., MRM-based multiplexed quantitation of 67 putative cardiovascular disease biomarkers in human plasma. Proteomics. 2012; 12(8): 1222-43; Chen Y T, Chen H W, Domański D et al. Multiplexed quantification of 63 proteins in human urine by multiple reaction monitoring-based mass spectrometry for discovery of potential bladder cancer biomarkers. J Proteomics. 2012; 75: 3529-3245; García-Bailo B et al. Dietary patterns and ethnicity are associated with distinct plasma proteomic groups. Am J Clin Nutr. 2012; 95(2): 352-61). MRM is the method of choice to verify results from discovery experiments, to validate discovered biomarkers or to measure proteins accurately and with high sensitivity in a single multiplexed assay. MRM is also increasingly substituting traditional analytical approaches based on antibody affinity as demonstrated in the improved clinical measurement of serum thyroglobulin in differentiated thyroid carcinoma patients with interfering endogenous autoantibodies. Antibody-based tests, like the enzyme-linked immunosorbent assay (ELISA), also do not easily multiplex and can suffer from phenomena which underreport high-target samples (hook effect) which is of particular concern in tumor marker assays where the concentration may range over several orders of magnitude. These advantages have made targeted MS methods ideal for biomarker assessment and validation, they have seen an increase in use in clinical proteomics and have been deemed key for bridging biomedical discovery and clinical implementation as expressed in the Nature Methods "Method of the Year" article (Vivien M. Targeted proteomics. Nature Methods. 2013; 10 (1): 19-22).

MRM methods coupled with peptide standards allow for unequivocal identification and quantification of proteins with very low probability of false positive results. In a single one-hour long analysis a panel of several (>300) peptides can be quantitated allowing for the multiplexed analysis of many targets within an experiment that can extend into thousands of samples. Recently, the quantitation of 142 proteins in human plasma was demonstrated in a single analysis with a wide dynamic range of measurement ranging from high mg/mL concentrations to very low abundance targets in the low ng/mL range (Percy A J, Chambers A G, Yang J, Hardie D B, Borchers C H. Advances in multiplexed MRM-based protein biomarker quantitation toward clinical utility. Biochim Biophys Acta. 2014; 1844: 917-926). This contrasts with techniques as ELISA which usually allow the analysis of a single compound in one experiment and underlines the favourable economics of targeted MS methods especially for protein targets for which no antibodies are available and whose development requires a significantly greater amount of time and money. Beyond effectively verifying biomarkers in clinical research it is also likely that targeted MS methods will within the next few years start to replace the old but currently the gold-standard in clinical assays, the ELISA, as MS equipment slowly becomes certified for clinical use and becomes increasingly more sensitive (Domański D, Smith D S, Miller C A et al. High-flow multiplexed MRM-based analysis of proteins in human plasma without depletion or enrichment. Clin Lab Med. 2011; 31: 371-84). This shift will especially occur quickly for proteins where interferences in the immunoassay are known (e.g. quantification of thyroglobulin), or where the immuno-based reagents do not exist or are of insufficient quality, and where the analyte is a specific isoform or modified protein indistinguishable by antibody-based assays.

Methods for kidney disease detection by protein profiling are known in the prior art. For example, WO2003002757 (A1) relates to improved methods of detecting an early stage of renal disease and/or renal complications of a disease, particularly diabetes, and discloses α1 acid glycoprotein (also known as orosomucoid) that is used in a method for diagnosing a renal disease and/or renal complications of a disease in a subject. The disease comprises a disease selected from the group consisting of diabetes insipidus, diabetes type I, diabetes II and renal disease, including IgA nephropathy. The invention provides a method of generating and analysis a urinary protein fragmentation profile, in terms of size and sequence of particular fragments derived from intact filtered proteins together with the position where enzymes scission occurs along the protein polypeptide chain which is characteristic of the diseased state of the kidney.

US20160061845 (A1) discloses a method of diagnosing and treating a subject having a nephrotic syndrome, comprising the step of determining the level of one or more biomarkers in a biofluid, wherein the biomarker indicates a level of a protein selected from Vitamin D-binding protein (VDBP), Neutrophil gelatinase-associated lipocalin (NGAL), Fetuin A, AGP1, AGP2, A2MCG, and prealbumin.

U.S. Pat. No. 8,927,220 (B2) relates to the selection of a protein that can be used for diagnosing IgA nephropathy and thin-glomerular-basement-membrane (hereinafter, referred to as "TGBM") nephropathy, and used as a biomarker for diagnosing serious cases thereof, and more particularly to a biomarker protein that shows increased/decreased levels in urine of IgA nephropathy patients or TGBM nephropathy patients compared to those in urine of normal people, and a diagnostic kit using the biomarker protein, which can be used to diagnose IgA nephropathy and TGBM nephropathy early, and predict and determine the degree of progression of the disease in advance. The biomarker protein that shows increased/decreased levels in urine of IgA nephropathy patients or TGBM nephropathy patients is selected from a vast list of biomarkers including Ceruloplasmin precursor, Alpha-1-antitrypsin precursor, Serotransferrin precursor, Transferrin variant Fragment and Alpha-2-macroglobulin precursor. US20140038203 (A1) discloses a method of detecting or predicting the onset or magnitude of kidney disease, such as acute kidney disease (AKI), previously called acute renal failure 1ARF. In various aspects, methods and kits are provided to detect specific urinary proteins associated with AKI diagnosis or prognosis using (a) angiotensinogen, apolipoprotein A-IV, pigment epithelium-derived factor, thymosin J34, insulin-like growth factor-binding protein I, myoglobin, vitamin D binding protein, complement C4-B, profilin-1, alpha-I antitrypsin, fibrinogen alpha chain, glutathione peroxidase 3, superoxide dismutase [Cu Zn], complement C3, antithrombin neutrophil defensin I, and (b) non-secretory ribonuclease, secreted Ly-6/uPAR-related protein I, pro-epidermal growth factor precursor (pro-EGF protein), and CD59 glycoprotein. Also the following markers are disclosed: Serotransferrin (P02787), Alpha-1-acid glycoprotein 1 (P02763), Alpha-1-acid glycoprotein 2 (ORM2) (P19652), Alpha-IB-glycoprotein (P04217), Ig lambda-2 chain C regions (IGLC2) (POCG05), Platelet glycoprotein VI (GP6) (Q9HCN6), SERPINA1, SERPINA3, SERPINA5, SERPINA7 and Cytosolic non-specific dipeptidase (CNDP2).

WO2013152989 (A2) relates to a cancer diagnostic and/or therapeutic and/or prognostic and/or patient stratification biomarker assay for the prognosis and/or diagnosis and/or therapy of colorectal cancer and/or lung cancer and/or pancreatic cancer comprising the combined measurement of at least two, preferably at least three protein/peptide biomarkers and/or fragments of protein biomarkers selected from a first group consisting of: CP; SERPINA3; PON1; optionally in combination with at least one or both protein/peptide biomarkers and/or fragments of protein biomarkers selected from a second group consisting of: IGFBP3; ATRN; LR61; TIMP1. In this publication SERPINA6 marker is also disclosed.

WO2011035323 (A1) relates to methods and compositions for monitoring, diagnosis, prognosis, and determination of treatment regimens in subjects suffering from or suspected of having a renal injury. In particular, the invention relates to using a plurality of assays, one or more of which is configured to detect a kidney injury marker as diagnostic and prognostic biomarkers in renal injuries. Additional clinical indicia may be combined with the kidney injury marker assay result(s) of the present invention. These include other biomarkers related to renal status. Examples include the following metalloproteinase inhibitor 2, soluble oxidized low-density lipoprotein receptor 1, interleukin-2, von Willebrand factor, granulocyte-macrophage colony-stimulating factor, tumor necrosis factor receptor superfamily member 11B, neutrophil elastase, interleukin-1 beta, heart-type fatty acid-binding protein, beta-2-glycoprotein 1, soluble CD40 ligand, coagulation factor VII, C-C motif chemokine 2, IgM, CA 19-9, IL-10, TNF-01, and myoglobin. It also discloses Ferritin (light chain, P02793; heavy chain P02794) and Alpha-1-acid glycoprotein 1 (P02763).

US2014235503 A1 indicates CNDP1 (also known as carnosinase) as protein associated with kidney function/dysfunction and publication in Postepy Hig. Med. Dosw. (2012); vol. 66, pages 215-221 discloses results of studies concerning carnosinase's role in kidney diseases, particularly in ischemia/reperfusion induced acute renal failure, diabetic nephropathy, gentamicin-induced nephrotoxicity and also in blood pressure regulation.

WO2017212463 suggest that specific urinary proteins: 1B-glycoprotein (A1BG), alpha-1-acid glycoprotein 1 (ORM-1), Ig lambda-2 chain C regions (IGLC2) and serotransferrin (TF), can be used in the diagnostics of IgAN.

Even though the number of different markers related to renal diseases is substantial, there is still a need for providing highly selective and sensitive diagnostic methods and tests that would enable diagnosis and monitoring of CKD, as well as differentiating between specific conditions.

DISCLOSURE OF INVENTION

The present inventors have found that a small set of proteins constitute suitable markers allowing for clear differentiation between controls and patients with CKD or glomerulopathy. Measurement of the level of e.g. only five protein markers is sufficient to clearly differentiate between healthy individuals and CKD patients of varied aetiology.

The term 'expression' as used herein refers to amounts or levels of said markers (proteins) or concentrations thereof in a urine sample. The skilled person is aware of numerous methods capable of measuring expression and/or protein levels in a sample, such as, but not limited to, Western blot methods, immunological methods, ELISA, chromatography, mass spectrometry etc. One of the approaches in the analysis of biological samples is using multiplexed peptide panels with targeted mass spectrometry-based methods (multiple reaction monitoring (MRM)) and parallel reaction monitoring (PRM)) for the accurate and sensitive quantitation of specific proteins.

The present inventors additionally identified a group of protein markers suitable not only for diagnosing CKD or glomerulopathy but also suitable for differentiation between different glomerulopathies. In particular, it was found that it is possible to diagnose a chronic kidney disease (CKD) or glomerulopathy in a subject, by:

(a) determining the level of at least three, or at, least four, or preferably at least five protein markers selected from the group: serum albumin (ALB), ceruloplasmin (CP), serotransferrin (TF), alpha-1B-glycoprotein (A1BG), alpha-1-acid glycoprotein 1 (ORM1), Ig gamma-2 chain C region (IGHG2), prothrombin, activation peptide fragment 1, activation peptide fragment 2, thrombin light chain; thrombin heavy chain (F2), alpha-1-acid glycoprotein 2 (ORM2), alpha-1-antitrypsin, short peptide from AAT (SERPINA1), zinc-alpha-2-glycoprotein (AZGP1), beta-Ala-His dipeptidase (CNDP1), corticosteroid-binding globulin (SERPINA6), Ig heavy chain V-III region JON, afamin (AFM), IGHV3-21, transthyretin (TTR), inter-alpha-trypsin inhibitor heavy chain H2 (ITIH2), hemopexin (HPX), haptoglobin, haptoglobin alpha chain, haptoglobin beta chain (HP), CD59 glycoprotein (CD59), alpha-2-macroglobulin (A2M), vitamin D-binding protein (GC), LYNX1, ganglioside GM2 activator, ganglioside GM2 activator isoform short (GM2A), antithrombin-III (SERPINC1), secreted Ly-6/uPAR-related protein 1 (SLURP1), complement C3, complement C3 beta chain, C3-beta-c, complement C3 alpha chain, C3a anaphylatoxin, acylation stimulating protein, complement C3b alpha chain, complement C3c alpha chain fragment 1, complement C3dg fragment, complement C3g fragment, complement C3d fragment, complement C3f fragment, complement C3c alpha chain fragment 2 (C3), immunoglobulin lambda-like polypeptide 5, Ig lambda-1 chain C regions (IGLL5), carboxypeptidase N catalytic chain (CPN1), complement decay-accelerating factor (CD55), Ig gamma-3 chain C region (IGHG3), IGHV5-51, liver-expressed antimicrobial peptide 2 (LEAP2), granulins, acrogranin, paragranulin, granulin-1, granulin-2, granulin-3, granulin-4, granulin-5, granulin-6, granulin-7 (GRN), phosphoglucomutase-1 (PGM1), serum paraoxonase/arylesterase 1 (PON1), complement C4-B, complement C4 beta chain, complement C4-B alpha chain, C4a anaphylatoxin, C4b-B;C4d-B, complement C4 gamma chain (C4B), Ig kappa chain V-III region B6, vacuolar protein sorting-associated protein VTA1 homolog (VTA1), vasorin (VASN), T complex protein 1 subunit alpha (TCP1), IGHV3-66, Ig kappa chain V-II region FR (IGKV2D 28), A0A0G2JMB2, Phosphatidylinositol-glycan-specific phospholipase D (GPLD1), leucine-rich alpha-2-glycoprotein (LRG1), prosaposin, saposin-A, saposin-B-Val, saposin-B, saposin-C, saposin-D (PSAP), alpha-1-antichymotrypsin, alpha-1-antichymotrypsin His-Pro-less (SERPINA3), Ig kappa chain C region (IGKC), cytoplasmic aconitate hydratase (ACO1), myoglobin (MB), L-xylulose reductase (DCXR), N-acetylmuramoyl-L-alanine amidase (PGLYRP2), WAP four-disulfide core domain protein 2 (WFDC2), aspartate aminotransferase, cytoplasmic (GOT1), Ig kappa chain V-III region POM, nucleosome assembly protein 1-like 4 (NAP1 L4), hemoglobin subunit alpha (HBA1), folate receptor alpha (FOLR1), laminin subunit gamma-1 (LAMC1), thyroxine-binding globulin (SERPINA7), Ig kappa chain V-I region Daudi, Ig kappa chain V-I region DEE, trefoil factor 2 (TFF2), programmed cell death 6-interacting protein (PDCD6IP), trefoil factor 1 (TFF1), Ig kappa chain V-I region HK102 (IGKV1-5), Ig gamma-1 chain C region (IGHG1), apolipoprotein A-I, proapolipoprotein A-I, truncated apolipoprotein A-I (APOA1), histidine triad nucleotide-binding protein 1 (HINT1), frizzled-4 (FZD4), IGLV3-10, protein FAM3B (FAM3B), interleukin-10 receptor subunit beta (IL10RB), calsyntenin-1, soluble A1c-alpha, CTF1-alpha (CLSTN1), peptidyl-prolyl cis-trans isomerase B (PPIB), metalloproteinase inhibitor 2 (TIMP2), ribonuclease pancreatic (RNASE1), fibrillin-1 (FBN1), programmed cell death protein 6 (PDCD6), 5(3)-deoxyribonucleotidase, cytosolic type (NT5C), Ig kappa chain V-III region VG (IGKV3D-11), Ig mu chain C region (IGHM), serine hydroxymethyltransferase, cytosolic (SHMT1), protein S100-A7 (S100A7), galectin-3, galectin (LGALS3), Ig heavy chain V-II region NEWM (IGHV4-61), uromodulin, uromodulin, secreted form (UMOD), basal cell adhesion molecule (BCAM), protocadherin Fat 4 (FAT4), hemoglobin subunit beta, LVV-hemorphin-7, spinorphin (HBB), carboxymethylenebutenolidase homolog (CMBL), protein CutA (CUTA), protocadherin gamma-C3 (PCDHGC3), ectonucleotide pyrophosphatase/phosphodiesterase family member 2 (ENPP2), CMRF35-like molecule 8 (CD300A), lactoylglutathione lyase (GLO1), glypican-4, secreted glypican-4 (GPC4), E3 ubiquitin-protein ligase RNF13 (RNF13), NHL repeat-containing protein 3 (NHLC3);

wherein said markers also comprise the non-full-length fragments thereof, in a urine sample from said subject and (b) assigning a probability of the subject having or being at a risk of chronic kidney disease or glomerulopathy based on the results of the assay of step (a).

Step (b) may be done e.g. by comparing the values obtained in (a) with mean values obtained for urine sample(s) derived from a healthy subject (i.e. not suffering from chronic kidney disease or glomerulopathy).

Furthermore, the present inventors found that it is possible to reliably differentiate between different glomerulopathies by analysing at least five, at least six, preferably at least seven protein markers from the group identified above.

In particular it was found that it is possible to identify a type of glomerulopathy in a subject, by:

(a) determining the level of at least five, at least six, or preferably at least seven protein markers selected from the group: serum albumin (ALB), ceruloplasmin (CP), serotransferrin (TF), alpha-1B-glycoprotein (A1BG), alpha-1-acid glycoprotein 1 (ORM1), Ig gamma-2 chain C region (IGHG2), prothrombin, activation peptide fragment 1, activation peptide fragment 2, thrombin light chain; thrombin heavy chain (F2), alpha-1-acid glycoprotein 2 (ORM2), alpha-1-antitrypsin, short peptide from AAT (SERPINA1), zinc-alpha-2-glycoprotein (AZGP1), beta-Ala-His dipeptidase (CNDP1), corticosteroid-binding globulin (SERPINA6), Ig heavy chain V-III region JON, afamin (AFM), IGHV3-21, transthyretin (TTR), inter-alpha-trypsin inhibitor heavy chain H2 (ITIH2), hemopexin (HPX), haptoglobin, haptoglobin alpha chain, haptoglobin beta chain (HP), CD59 glycoprotein (CD59), alpha-2-macroglobulin (A2M), vitamin D-binding protein (GC), LYNX1, ganglioside GM2 activator, ganglioside GM2 activator isoform short (GM2A), antithrombin-III (SERPINC1), secreted Ly-6/uPAR-related protein 1 (SLURP1), complement C3, complement C3 beta chain, C3-beta-c, complement C3 alpha chain, C3a anaphylatoxin, acylation stimulating protein, complement C3b alpha chain, complement C3c alpha chain fragment 1, complement C3dg fragment, complement C3g fragment, complement C3d fragment, complement C3f fragment, complement C3c alpha chain fragment 2 (C3), immunoglobulin lambda-like polypeptide 5, Ig lambda-1 chain C regions (IGLL5), carboxypeptidase N catalytic chain (CPN1), complement decay-accelerating factor (CD55), Ig gamma-3 chain C region (IGHG3), IGHV5-51, liver-expressed antimicrobial peptide 2 (LEAP2), granulins, acrogranin, paragranulin, granulin-1, granulin-2, granulin-3, granulin-4, granulin-5, granulin-6, granulin-7 (GRN), phosphoglucomutase-1 (PGM1), serum paraoxonase/arylesterase 1 (PON1), complement C4-B, complement C4 beta chain, complement C4-B alpha chain, C4a anaphylatoxin, C4b-B;C4d-B, complement C4 gamma chain (C4B), Ig kappa chain V-III region B6, vacuolar protein sorting-associated protein VTA1 homolog (VTA1), vasorin (VASN), T complex protein 1 subunit alpha (TCP1), IGHV3-66, Ig kappa chain V-II region FR (IGKV2D 28), A0A0G2JMB2, Phosphatidylinositol-glycan-specific phospholipase D (GPLD1), leucine-rich alpha-2-glycoprotein (LRG1), prosaposin, saposin-A, saposin-B-Val, saposin-B, saposin-C, saposin-D (PSAP), alpha-1-antichymotrypsin, alpha-1-antichymotrypsin His-Pro-less (SERPINA3), Ig kappa chain C region (IGKC), cytoplasmic aconitate hydratase (ACO1), myoglobin (MB), L-xylulose reductase (DCXR), N-acetylmuramoyl-L-alanine amidase (PGLYRP2), WAP four-disulfide core domain protein 2 (WFDC2), aspartate aminotransferase, cytoplasmic (GOT1), Ig kappa chain V-III region POM, nucleosome assembly protein 1-like 4 (NAP1 L4), hemoglobin subunit alpha (HBA1), folate receptor alpha (FOLR1), laminin subunit gamma-1 (LAMC1), thyroxine-binding globulin (SERPINA7), Ig kappa chain V-I region Daudi, Ig kappa chain V-I region DEE, trefoil factor 2 (TFF2), programmed cell death 6-interacting protein (PDCD6IP), trefoil factor 1 (TFF1), Ig kappa chain V-I region HK102 (IGKV1-5), Ig gamma-1 chain C region (IGHG1), apolipoprotein A-I, proapolipoprotein A-I, truncated apolipoprotein A-I (APOA1), histidine triad nucleotide-binding protein 1 (HINT1), frizzled-4 (FZD4), IGLV3-10, protein FAM3B (FAM3B), interleukin-10 receptor subunit beta (IL10RB), calsyntenin-1, soluble A1c-alpha, CTF1-alpha (CLSTN1), peptidyl-prolyl cis-trans isomerase B (PPIB), metalloproteinase inhibitor 2 (TIMP2), ribonuclease pancreatic (RNASE1), fibrillin-1 (FBN1), programmed cell death protein 6 (PDCD6), 5(3)-deoxyribonucleotidase, cytosolic type (NT5C), Ig kappa chain V-III region VG (IGKV3D-11), Ig mu chain C region (IGHM), serine hydroxymethyltransferase, cytosolic (SHMT1), protein S100-A7 (S100A7), galectin-3, galectin (LGALS3), Ig heavy chain V-II region NEWM (IGHV4-61), uromodulin, uromodulin, secreted form (UMOD), basal cell adhesion molecule (BCAM), protocadherin Fat 4 (FAT4), hemoglobin subunit beta, LVV-hemorphin-7, spinorphin (HBB), carboxymethylenebutenolidase homolog (CMBL), protein CutA (CUTA), protocadherin gamma-C3 (PCDHGC3), ectonucleotide pyrophosphatase/phosphodiesterase family member 2 (ENPP2), CMRF35-like molecule 8 (CD300A), lactoylglutathione lyase (GLO1), glypican-4, secreted glypican-4 (GPC4), E3 ubiquitin-protein ligase RNF13 (RNF13), NHL repeat-containing protein 3 (NHLC3);

wherein said markers also comprise the non-full-length fragments thereof, in a urine sample from said subject and (b) assigning a probability of the subject having or being at a risk of a particular glomerulopathy type based on the results of the assay of step (a).

Step (b) may be done e.g. by comparing the values obtained in (a) with mean values obtained for urine sample (s) derived from subjects with known particular glomerulopathy(/ies).

Step (b) may involve assigning a probability of the subject having or being at a risk of IgA-nephropathy (IgAN), membranous nephropathy (MN) or lupus nephritis (LN).

The present inventors selected the most suitable markers from the group as defined above and developed a model allowing to differentiate between particular glomerulopathies, consisting of 18 protein markers.

Step (a) may involve determination of the level of at least five, or at least six or at least seven protein markers selected from the group consisting of Ig gamma-2 chain C region (IGHG2), serum albumin (ALB), ceruloplasmin (CP), thrombin (F2), haptoglobin beta chain (HP), alpha-1-antitrypsin (SERPINA1), Ig kappa chain V-I region HK102 (IGKV1-5), myoglobin (MB), alpha-1-acid glycoprotein 1 (ORM1), serotransferrin (TF), alpha-1B-glycoprotein (A1BG), Ig kappa chain V-I region Daudi (P04432), ganglioside GM2 activator (GM2A), alpha-1-acid glycoprotein 2 (ORM2), zinc-alpha-2-glycoprotein (AZGP1), afamin (AFM), NHL repeat-containing protein 3 (NHLC3), inter-alpha-trypsin inhibitor heavy chain H2 (ITIH2), wherein said markers also comprise the non-full-length fragments thereof, in a urine sample from said subject, in particular in order to differentiate between particular glomerulopathies.

Step (b) may involve identifying whether the subject has or is at risk of having of IgA-nephropathy (IgAN), membranous nephropathy (MN) or lupus nephritis (LN).

Step (b) may be done e.g. by comparing the values obtained in (a) with mean values obtained for urine sample (s) derived from subjects with known IgA-nephropathy (IgAN), membranous nephropathy (MN) or lupus nephritis (LN).

Step (a) may involve determination of the level of at least the following: Ig gamma-2 chain C region (IGHG2), ceruloplasmin (CP), thrombin (F2), alpha-1-acid glycoprotein 1 (ORM1), alpha-1B-glycoprotein (A1BG), Ig kappa chain V-I region Daudi (P04432), NHL repeat-containing protein 3 (NHLC3), wherein said markers also comprise the non-full-length fragments thereof, in a urine sample from said subject, in particular in order to differentiate between particular glomerulopathies, in particular identifying whether the subject has or is at risk of having of IgA-nephropathy (IgAN), membranous nephropathy (MN) or lupus nephritis (LN).

The present inventors also found that a small group of protein markers can be determined, which allows to reliably and quickly differentiate between healthy controls and subjects having or being at a risk of having chronic kidney disease (CKD) or glomerulopathy.

The object of the present invention is therefore a method of diagnosis of a chronic kidney disease (CKD) or glomerulopathy in a subject, comprising the following steps:

(a) determination of the level of at least three or four or five protein markers selected from the group consisting of serum albumin (ALB), alpha-1-antitrypsin (serpina1), alpha-1-acid glycoprotein 1 (ORM1), serotransferrin (TF) and trefoil factor 1 (TFF), wherein said markers also comprise the non-full-length fragments thereof, in a urine sample from said subject and (b) assigning a probability of the subject having or being at a risk of chronic kidney disease or glomerulopathy based on the results of the assay of step (a).

Step (b) may be done e.g. by comparing the values obtained in (a) with mean values obtained for urine sample (s) derived from a healthy subject (i.e. not suffering from chronic kidney disease or glomerulopathy).

Step (b) may also or alternatively be done e.g. by comparing the values obtained in (a) with mean values obtained for urine sample(s) derived from subjects with known particular glomerulopathy(/ies).

Serum albumin (Uniprot ID P02768) is the most abundant blood protein in mammals. Albumin is essential for maintaining the oncotic pressure needed for proper distribution of body fluids between blood vessels and body tissues. It also acts as a plasma carrier by non-specifically binding several hydrophobic steroid hormones and as a transport protein for hemin and fatty acids.

Alpha-1-antitrypsin (Uniprot ID P01009) is a protease inhibitor and it is a single-chain glycoprotein consisting of 394 amino acids. It protects tissues from enzymes of inflammatory cells, especially neutrophil elastase. Besides limiting elastase activity to limit tissue degradation, the inhibitor also acts to induce locomotion of lymphocytes through tissue including immature T cells through the thymus where immature T cells mature to become immunocompetent T cells that are released into tissue to elevate immune responsiveness.

Alpha-1-acid glycoprotein 1 (Uniprot ID P02763), also referred to as Orosomucoid 1 (ORM1), is a 41-43-kDa glycoprotein encoded by the gene localized in human genome at 9q32 (by Entrez Gene). In humans, the peptide moiety is a single chain of 201 amino acids of 23.5 kDa of molecular weight. Carbohydrates constitute approximately the remaining 45% of the molecular weight of the posttranslationally modified protein, attached in the form of five to six highly sialylated complex-type-N-linked glycans. AGP1 belongs to the family of acute phase proteins. Accordingly, its serum concentration increases in response to systemic tissue injury, inflammation or infection. This increase in serum concentration results primarily from an elevated protein production in liver, as a part of an acute phase response. Expression of the AGP1 gene is a subject of regulation by a combination of the major regulatory mediators of an acute phase response, i.e. a cytokine network containing mainly interleukin-1beta (IL-1beta), tumor necrosis factor-alpha (TNFalpha), interleukin-6 and a range of IL-6-related cytokines as well as glucocorticoids. The biological function of AGP1 is not clear. The main known ability of AGP1 is to bind and to carry numerous basic and neutral lipophilic drugs from endogenous (e.g. steroid hormones) and exogenous (such as phenobarbital) origin. The primary factor influencing the immunomodulatory or the binding activities of AGP1 is related to the composition of carbohydrates bound to AGP1 polypeptide.

Serotransferrin (TF) (Uniprot ID P02787), also referred to as transferrin or siderophilin, is a ~80 kDa acute-phase serum glycoprotein responsible for transportation of Fe3+ ions from sites of absorption and heme degradation to the sites of storage or degradation. The main site of production is liver, but this protein can be also produced in peripheral tissues. Serotransferrin plays a role in multiple processes in human body. In nephrotic syndrome, urinary loss of transferrin can be one of the causative mechanisms for an iron-resistant microcytic anemia. Used as a urine biomarker, serotransferrin has been reported one of the predictors of renal functional decline in lupus nephritis (see Abulaban K M et al. Lupus. 2016, in press).

Trefoil factor 1 (TFF) (Uniprot ID P04155) is a member of a group of stable secretory proteins expressed in gastrointestinal mucosa. Their functions are not defined, but they are thought to play an important role in maintenance and protection of mucosal surfaces in the gastrointestinal tract through an interaction with mucins, enhancement of "restitution" (i.e., rapid mucosal repair by cell migration), modulation of mucosal regeneration by differentiation from stem cells, and modulation of the mucosal immune response. The TFF gene, which is expressed in the gastric mucosa, has also been studied because of its expression in human tumors. This gene and two other related trefoil family member genes are found in a cluster on chromosome 21.

The term "a non-full length fragment" as used herein refers to marker proteins truncated on one or both sides of the amino acid sequence of the complete protein. For example, a non-full length fragment of TF marker is any TF protein fragment having molecular weight lower than 80 kDa and preferably any protein having molecular weight of 10-70 kDa.

The term "quantitative" as used herein refers to a determination made using a quantitative measurement technique, wherein absolute amounts are measured. An example of such a technique includes mass spectrometry and ELISA. The term "semi-quantitative" as used herein refers to a determination made using a semi-quantitative measurement technique, wherein relative amounts are determined. An example of such a technique includes Western blot.

The 'subject' in the present invention, can be any animal capable of developing a glomerulopathy or a chronic kidney disease, in particular a mammal, preferably the subject is human.

In said method of the invention, a urine sample collected from a subject is analysed, wherein said analysis usually comprises a step of separating all the solid parts from the sample, for example by filtration, centrifuging, or any other suitable method, and subsequently a step of identification of the of at least three of the markers selected from a group consisting of serum albumin (ALB), alpha-1-antitrypsin (serpina1), alpha-1-acid glycoprotein 1 (ORM1), serotransferrin (TF) and trefoil factor 1 (TFF).

Determination in step (a) can be performed by any of the suitable methods known in the art.

The presence of the abovementioned markers in the urine sample in the method of the invention and the level of each of these markers can be preferably determined by mass spectrometry (MS). In this aspect of the invention, the amino acid sequence can be identified based mass-to-charge ratio used to generate high-resolution mass spectra. An example of that method is presented in Example 1 below. In preferred aspect of this invention a tandem mass spectrometry (MS/MS) can be used as it was previously described, for example, in Aebersold R and Mann M, Nature, 2003, 422(6928), 198-207, and in Yates III J. R., Annual Review of Biophysics and Biomolecular Structure, 2004, 33, 297-316. Alternatively, different MS based approaches can also be used to identify the above identified combinations of markers in urine samples (such as MALDI (matrix-assisted laser desorption) imaging mass spectrometry (MALDI-IMS), liquid chromatography-mass spectrometry (LC-MS), and electrospray ionization ESI MS and their combination), In another embodiment, the levels of the abovementioned markers, can be identified in said urine sample by ELISA-based methods, including microfluidic ELISA, protein electrophoresis and Western blotting, including microfluidic electrophoresis and Western blotting using capillary electrophoresis. These methods are well known in the art.

Ultrasensitive microfluidic solid-phase ELISA was reported and described, for example, in Lab Chip 2013; 13(21), 4190-4197. This method is useful in rapid and ultrasensitive quantitative detection of low abundance proteins. The microwell-based solid-phase ELISA strategy provides an expandable platform for developing the next-generation microfluidic immunoassay systems that integrate and automate digital and analog measurements to further improve the sensitivity, dynamic ranges, and reproducibility of proteomic analysis.

The other method, Microfluidic Electrophoresis Assays for Rapid Characterization of Protein, was characterized and discussed in Science/AAAS audio webinar (Nov. 14, 2012) by Dr. Joey Studts from Boehringer Ingelheim in Germany, Dr. Timothy Blanc from ImClone Systems in Branchburg, N.J., and Dr. Bahram Fathollahi from PerkinElmer in San Francisco, Calif. What was discussed there concerned the application of high throughput microfluidic technologies to the analysis of biotherapeutic proteins. These microfluidic-based assays provide a good solution because they address the limitations of SDS-PAGE, as well as other separation assays that depend on conventional capillary electrophoresis in particularly analysis time, which can be reduced to a minute or less per sample. Advantages include miniaturization, integration, and automation, which enable labs to perform experiments at a rapid turnaround time, thus faster analytical analysis to reduce time and expense in the process development.

In publication Anal Chem. 2011; 83(4), 1350-1355 a microscale Western blotting system based on separating sodium-dodecyl sulfate protein complexes by capillary gel electrophoresis followed by deposition onto a blotting membrane for immunoassay was described by Anderson et al. In the system, the separation capillary is grounded through a sheath capillary to a mobile X-Y translation stage, which moves a blotting membrane past the capillary outlet for protein deposition. The obtained results demonstrate substantial reduction in time requirements and improvement in mass sensitivity compared to conventional Western blots.

Western blotting using capillary electrophoresis shows promise to analyse low volume samples with reduced reagents and time, while retaining the information content of a typical Western blot.

In a preferred method according to the invention, determination in step (a) is performed using mass spectrometry (MS).

In a preferred embodiment of the method according to the invention, step (a) involves determination of the level of all five protein markers serum albumin (ALB), alpha-1-antitrypsin (serpina1), alpha-1-acid glycoprotein 1 (ORM1), serotransferrin (TF) and trefoil factor 1 (TFF).

In a preferred embodiment of the method according to the present invention, the probability of the subject having or being at a risk of chronic kidney disease or glomerulopathy is assigned in step (b) using the following formula:

$$p(\text{disease}) = \frac{\exp(E)}{(1 + \exp(E))}$$

wherein:

$E = 17.204550857965 - 5.75799550569336 * 10^{-10} * x_1 -$
$9.37976121221068 * 10^{-9} * x_2 +$
$1.32966288022553 * 10^{-8} * x_3 +$
$2.5638225555611 * 10^{-8} * x_4 +$
$4.03113433888467 * 10^{-7} * x_5;$ wherein $x_1$ is the determined level for Serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); $x_5$ is the determined level for Trefoil factor 1 (TFF1).

The level of each marker may be determined, for example, by mass spectrometry (e.g. as signal intensity).

The diagnostic approach as provided herein may involve two parts.

In the first part, the aim is to ascertain whether a sample is derived from a healthy subject or a subject having a disease, the disease being chronic kidney disease or glomerulopathy. This part may be performed as follows:

a urine sample form a subject is analysed and the level of at least three or four or five protein markers selected from the group consisting of serum albumin (ALB), alpha-1-antitrypsin (serpina1), alpha-1-acid glycoprotein 1 (ORM1), serotransferrin (TF) and trefoil factor 1 (TFF) is evaluated; the level of the abovementioned protein markers may be measured with any suitable method known in the art, as described hereinabove, preferably by mass spectrometry, wherein said markers also comprise the non-full-length fragments thereof.

the probability of the subject having or being at a risk of chronic kidney disease or glomerulopathy is assigned using the following formula:

$$p(\text{disease}) = \frac{\exp(E)}{(1 + \exp(E))}$$

wherein:

$E = 17.204550857965 - 5.75799550569336 * 10^{-10} * x_1 -$
$9.37976121221068 * 10^{-9} * x_2 +$
$1.32966288022553 * 10^{-8} * x_3 +$
$2.5638225555611 * 10^{-8} * x_4 +$
$4.03113433888467 * 10^{-7} * x_5;$ wherein $x_1$ is the determined level for Serum albumin (ALB; P02768); $x_2$ is the determined level for alpha-1-antitrypsin (serpina1; P01009); $x_3$ is the determined level for alpha-1-acid glycoprotein 1 (ORM1; P02763); $x_4$ is the determined level for serotransferrin (TF; P0278); $x_5$ is the determined level for Trefoil factor 1 (TFF1; P04155).

The result in this part allows classification of the sample as either derived form a healthy subject or as derived from a subject having or being at a risk of chronic kidney disease or glomerulopathy.

In the second part of the diagnostic approach, a sample determined to be derived from a subject having or being at a risk of chronic kidney disease or glomerulopathy, is further classified into one of pre-determined groups. This may be done using a decision tree, such as provided on FIG. 7. In this example, in each step a decision is made using the measured level of the indicated protein marker and a subsequent calculation step is selected based on the result of the preceding step. For example, a result of P02787 (TF) as obtained by mass spectrometry is >=8.4e+10. This directs to the left arm in the tree on FIG. 7. A simultaneous result for P02763 being <4.0e+10, indicates that the sample is derived from a subject suffering from or at a risk of having IgAN (Group 3).

The diagnostic method may further or alternatively involve diagnosis of a chronic kidney disease (CKD) or glomerulopathy in a subject, comprising the following steps:

(a) determination of the level of at least five, or at least six or at least seven protein markers selected from the group consisting of Ig gamma-2 chain C region (IGHG2), serum albumin (ALB), ceruloplasmin (CP), thrombin (F2), haptoglobin beta chain (HP), alpha-1-antitrypsin (SERPINA1), Ig kappa chain V-I region HK102 (IGKV1-5), myoglobin (MB), alpha-1-acid glycoprotein 1 (ORM1), serotransferrin (TF), alpha-1B-glycoprotein (A1BG), Ig kappa chain V-I region Daudi (P04432), ganglioside GM2 activator (GM2A), alpha-1-acid glycoprotein 2 (ORM2), zinc-alpha-2-glycoprotein (AZGP1), afamin (AFM), NHL repeat-containing protein 3 (NHLC3), inter-alpha-trypsin inhibitor heavy chain H2 (ITIH2);

wherein said markers also comprise the non-full-length fragments thereof, in a urine sample from said subject and (b) assigning a probability of the subject having or being at a risk of chronic kidney disease or glomerulopathy based on the results of the assay of step (a).

Step (b) may be done e.g. by comparing the values obtained in (a) with mean values obtained for urine sample (s) derived from healthy subjects and/or subjects with known particular glomerulopathy(/ies).

In a preferred embodiment of the above method, step (b) involves identifying whether the subject has or is at risk of having of IgA-nephropathy (IgAN), membranous nephropathy (MN) or lupus nephritis (LN).

Step (a) may involve determination of the level of at least the following: Ig gamma-2 chain C region (IGHG2), ceruloplasmin (CP), thrombin (F2), alpha-1-acid glycoprotein 1 (ORM1), alpha-1B-glycoprotein (A1BG), Ig kappa chain V-I region Daudi (P04432), NHL repeat-containing protein 3 (NHLC3), wherein said markers also comprise the non-full-length fragments thereof, in a urine sample from said subject, in particular in order to differentiate between particular glomerulopathies, in particular identifying whether the subject has or is at risk of having of IgA-nephropathy (IgAN), membranous nephropathy (MN) or lupus nephritis (LN).

In a preferred embodiment of the above method, step (a) involves determination of the level of at least the following:

Ig gamma-2 chain C region (IGHG2), ceruloplasmin (CP), thrombin (F2), alpha-1-acid glycoprotein 1 (ORM1), alpha-1B-glycoprotein (A1BG), Ig kappa chain V-I region Daudi (P04432), NHL repeat-containing protein 3 (NHLC3).

Another object of the present invention is a method of monitoring a response to treatment, comprising the following steps:

(a) determination of the level, at a first point in time, for three or four or five of the markers selected from a group consisting of serum albumin (ALB), alpha-1-antitrypsin (serpina1), alpha-1-acid glycoprotein 1 (ORM1), serotransferrin (TF) and trefoil factor 1 (TFF), wherein said markers also comprise the non-full-length fragments thereof, in a urine sample from a subject;

(b) repeating the assay of step (a) at a later point in time after a period wherein the subject was undergoing a treatment;

(c) assessing a response to said treatment by comparing the results of the assays of steps (a) and (b), wherein a change in marker levels, in particular a decrease in marker levels after treatment are indicative of a positive response to treatment.

In a preferred method according to the invention, determination of the level in step (a) and (b) is performed using mass spectrometry (MS).

In a preferred embodiment of the method of monitoring a response to treatment of the invention, step c) involves assigning a probability of the subject having or being at a risk of chronic kidney disease or glomerulopathy based on the results of the assay for the results of steps (a) and (b) and assessing a response to said treatment by comparing the results of probability for steps (a) and (b).

In a preferred embodiment of the method of monitoring a response to treatment of the invention, the probability of the subject having or being at a risk of chronic kidney disease or glomerulopathy is assigned in step c) using the following formula:

$$p(\text{disease}) = \frac{\exp(E)}{(1 + \exp(E))}$$

wherein:

$E = 17.204550857965 - 5.75799550569336 * 10^{-10} * x_1 - 9.37976121221068 * 10^{-9} * x_2 + 1.32966288022553 * 10^{-8} * x_3 + 2.5638225555611 * 10^{-8} * x_4 + 4.03113433888467 * 10^{-7} * x_5;$ wherein $x_1$ is the determined level for Serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); $x_5$ is the determined level for Trefoil factor 1 (TFF1).

Another object of the present invention is a method of treatment of a chronic kidney disease (CKD) or glomerulopathy in a subject, comprising the following steps:

(a) determination of the level of at least three or four or five protein markers selected from the group consisting of serum albumin (ALB), alpha-1-antitrypsin (serpina1), alpha-1-acid glycoprotein 1 (ORM1), serotransferrin (TF) and trefoil factor 1 (TFF), wherein said markers also comprise the non-full-length fragments thereof, in a urine sample from said subject and (b) assigning a probability of the subject having or being at a risk of chronic kidney disease or glomerulopathy based on the results of the assay of step (a);

(c) administering treatment against a chronic kidney disease (CKD) or glomerulopathy in the subject evaluated in step (b) as having or being at a risk of chronic kidney disease or glomerulopathy.

Determination in step (a) can be performed by any of the suitable methods known in the art, as discussed above.

The presence of the abovementioned markers in the urine sample in the method of the invention can be preferably determined by mass spectrometry (MS).

In a preferred embodiment of the method according to the invention, step (a) involves determination of the level of all five protein markers serum albumin (ALB), alpha-1-antitrypsin (serpina1), alpha-1-acid glycoprotein 1 (ORM1), serotransferrin (TF) and trefoil factor 1 (TFF).

In a preferred embodiment of the method according to the present invention, the probability of the subject having or being at a risk of chronic kidney disease or glomerulopathy is assigned in step (b) using the following formula:

$$p(\text{disease}) = \frac{\exp(E)}{(1 + \exp(E))}$$

wherein:

$E = 17.204550857965 - 5.75799550569336 * 10^{-10} * x_1 - 9.37976121221068 * 10^{-9} * x_2 + 1.32966288022553 * 10^{-8} * x_3 + 2.5638225555611 * 10^{-8} * x_4 + 4.03113433888467 * 10^{-7} * x_5;$ wherein $x_1$ is the determined level for Serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); $x_5$ is the determined level for Trefoil factor 1 (TFF1).

The treatment against a chronic kidney disease (CKD) or glomerulopathy administered in step (c) may be any treatment known in the art for such purposes. The key advantage of the present invention is providing a tool of possibly quickly selecting patients having or being at a risk of a chronic kidney disease (CKD) or glomerulopathy, possibly even before manifestation of symptoms. This allows for a more effective treatment and an increase in patient's well-being.

In the clinical setting, the final diagnosis of IgAN or MN or LN results in different therapeutical decisions for each of these diseases. Therefore, IgAN, MN and LN have separate treatment recommendations described in medical literature, including e.g.: different drugs and their doses, duration of treatment and monitoring. In general, in the treatment of IgAN, MN and LN, physicians currently rely on KDIGO (Kidney Disease-Improving Global Outcomes) recommendations from 2012 (KDIGO Clinical Practice Guideline for Glomerulonephritis 2012, Kidney International 2012). The next ones are awaited to be released in 2021. Additional guidelines:

1. the treatment of IgA nephropathy may include e.g.:
a. Floege J et al. Management and treatment of glomerular diseases (part 1): conclusions from a Kidney Disease: Improving Global Outcomes (KDIGO) Controversies Conference. Kidn Int 2019; 95: 268-280

2. the treatment of membranous nephropathy may include e.g.:
a. Rojas-Rivera J E et al. EDITORIAL COMMENT: Treatment of idiopathic membranous nephropathy in adults: KDIGO 2012, cyclophosphamide and cyclosporine A are out, rituximab is the new normal. Clinical Kidney Journal 2019; 12: 629-638
b. Floege J et al. Management and treatment of glomerular diseases (part 1): conclusions from a Kidney Disease: Improving Global Outcomes (KDIGO) Controversies Conference. Kidn Int 2019; 95: 268-280
3. the treatment of lupus nephritis may include e.g.:
a. EULAR (European League Against Rheumatism) and the Renal Association-European Dialysis and Transplant Association (ERA-EDTA) updated recommendations for the management of lupus nephritis (LN). These recommendations were "developed by a large group of physicians from different specialties and nurses caring for LN, with input from patients". The guidelines are available in the Annals of the Rheumatic Diseases: Fanouriakis A, et al. 2019 Update of the Joint European League Against Rheumatism and European Renal Association-European Dialysis and Transplant Association (EULAR/ERA-EDTA) recommendations for the management of lupus nephritis. Ann Rheum Dis 2020; 79: 713-723
b. Parikh S V et al. Update on Lupus Nephritis: Core Curriculum 2020. AJKD 2020; 76: 265-281.

The diagnostic steps (a) and (b) may further or alternatively be accompanied by diagnosis of a chronic kidney disease (CKD) or glomerulopathy in a subject, comprising the following steps:

(a)' determination of the level of at least five, or at least six or at least seven protein markers selected from the group consisting of Ig gamma-2 chain C region (IGHG2), serum albumin (ALB), ceruloplasmin (CP), thrombin (F2), haptoglobin beta chain (HP), alpha-1-antitrypsin (SERPINA1), Ig kappa chain V-I region HK102 (IGKV1-5), myoglobin (MB), alpha-1-acid glycoprotein 1 (ORM1), serotransferrin (TF), alpha-1B-glycoprotein (A1BG), Ig kappa chain V-I region Daudi (P04432), ganglioside GM2 activator (GM2A), alpha-1-acid glycoprotein 2 (ORM2), zinc-alpha-2-glycoprotein (AZGP1), afamin (AFM), NHL repeat-containing protein 3 (NHLC3), inter-alpha-trypsin inhibitor heavy chain H2 (ITIH2);

wherein said markers also comprise the non-full-length fragments thereof, in a urine sample from said subject and (b)' assigning a probability of the subject having or being at a risk of chronic kidney disease or glomerulopathy based on the results of the assay of step (a).

Step (b)' may be done e.g. by comparing the values obtained in (a)' with mean values obtained for urine sample(s) derived from healthy subjects and/or subjects with known particular glomerulopathy(/ies).

In a preferred embodiment of the above method, step (b)' involves identifying whether the subject has or is at risk of having of IgA-nephropathy (IgAN), membranous nephropathy (MN) or lupus nephritis (LN). The treatment administered in (c) may then reflect the result of identification in step (b)'.

Step (a) may additionally involve determination of the level of at least the following: Ig gamma-2 chain C region (IGHG2), ceruloplasmin (CP), thrombin (F2), alpha-1-acid glycoprotein 1 (ORM1), alpha-1B-glycoprotein (A1BG), Ig kappa chain V-I region Daudi (P04432), NHL repeat-containing protein 3 (NHLC3), wherein said markers also comprise the non-full-length fragments thereof, in a urine sample from said subject, in particular in order to differentiate between particular glomerulopathies, in particular identifying whether the subject has or is at risk of having of IgA-nephropathy (IgAN), membranous nephropathy (MN) or lupus nephritis (LN).

In a preferred embodiment of the above method, step (a) involves determination of the level of at least the following: Ig gamma-2 chain C region (IGHG2), ceruloplasmin (CP), thrombin (F2), alpha-1-acid glycoprotein 1 (ORM1), alpha-1B-glycoprotein (A1BG), Ig kappa chain V-I region Daudi (P04432), NHL repeat-containing protein 3 (NHLC3).

In an embodiment, other parameters may additionally be used to assist diagnosis. In the art, glomerulonephritis can be suspected based on the e.g.: a) anamnesis; b) additional (mainly blood and urine) tests, including the occurrence of erythro- or hematuria, but especially c) proteinuria of varying severity. If the latter is present, the first step is to confirm the glomerular origin of proteinuria.

The method of the present invention, based on the coexistence of five defined and selected proteins (serum albumin (ALB), alpha-1-antitrypsin (serpina1), alpha-1-acid glycoprotein 1 (ORM1), serotransferrin (TF) and trefoil factor 1 (TFF)), enables to distinguish patients with IgAN or MN or LN or other diseases from healthy individuals (see FIG. 6, panel A). The advantage of the present methods is that, the negative result of the test, actually (in almost 98%) excludes the diagnosis of IgAN or MN or LN which increases the accuracy of diagnosis in comparison to routine urine test. Moreover the results are independent from the extent of proteinuria. This is one of the advantages of the present methodology comparing to routine urinalysis. In the clinical setting, this methodology might enable to set the final diagnosis in patients with the suspicion of glomerulonephritis, without the need of kidney biopsy.

The next stage, based on the additional analysis of the selected proteins from the entire panel, may involve distinguishing IgAN from MN and from LN (FIG. 6, panel B and FIG. 7).

It should be emphasized that the primary difference between the tests already carried out and the current approach according to the present invention, is the transition from the assessment of the pooled urine samples to the individual evaluation of each protein in a given patient or a healthy person and a direct correlation of these results with the known clinical parameters in each case.

Thus, the current method fits perfectly into the trend of 'personalized medicine', allowing precise correlation of the data obtained in the course of the current project with a retrospective assessment of each individual patient.

The method of the present invention provides a unique opportunity to better understand the pathogenesis and pathophysiology of IgAN, MN and LN and other glomerulopathies.

The analysis performed in the study as described in the present invention provides a new, specific method for diagnosing, monitoring and treating IgAN, MN, LN and other glomerulopathies. Indeed, in addition to substantial cognitive value, the current method is of practical importance in the diagnosis and monitoring of IgAN, MN and LN patients, e.g. by reducing the need for renal biopsy. As a result, this should improve the quality of life of patients.

Given mentioned at the outset epidemiology of CKD and the related health care costs, this may also translate into the health care system savings.

The present model provides a template to evaluate a given subject's probability of having a glomerulopathy or a chronic kidney disease. The evaluation may involve assessing the subject's urine level of a first marker, determining the probability of the subject having a glomerulopathy or a chronic kidney disease based on the present model, and then assessing the subject's urine level of a second marker and determining the probability of the subject having a glomerulopathy or a chronic kidney disease based on the present model, and so on, for next markers as needed. The final probability of the subject having a glomerulopathy or a chronic kidney disease, or being at a risk of having a glomerulopathy or a chronic kidney disease, or in contrast, not having or being at a risk thereof, for that particular subject can then be calculated from the corresponding probabilities obtained from each marker.

The diagnostics and probability calculation as explained above (and as shown in the Examples herein) can be performed utilizing any of the markers listed above, as all of them were found to have a connection with the diagnosed conditions. The protein markers found to be the most significant or most convenient to use in the methods of the present invention are also disclosed and claimed herein. The present invention also relates to preferred variant of the method, wherein the formula $$p(\text{disease}) = \frac{\exp(E)}{(1+\exp(E))}$$

wherein:

$E = 17.204550857965 - 5.75799550569336 * 10^{-10} * x_1 - 9.37976121221068 * 10^{-9} * x_2 + 1.32966288022553 * 10^{-8} * x_3 + 2.5638225555611 * 10^{-8} * x_4 + 4.03113433888467 * 10^{-7} * x_5;$ wherein $x_1$ is the determined level for Serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); $x_5$ is the determined level for Trefoil factor 1 (TFF1);

is employed for probability calculation.

The present inventors have also found that it is important that protein markers are analysed in a urine sample obtained from a midstream of the second- or third-morning (SPOT) sample and not from first morning samples. SPOT samples were found to provide for MS measurements with a higher prognostic and diagnostic value.

It should be noted that in the described methods, detection and quantitative analysis is based on so-called "tryptic peptides". In other words, not the intact proteins present in the basic biological material are analysed, but their derivatives. Protein mixture obtained from the urine sample is digested in vitro with a mixture of enzymatic proteases, such as LysC and Trypsin.

Both of the abovementioned proteases are recognizing specific amino acids, lysine and arginine, in protein sequences and hydrolysing peptide bonds in the positions. The resulting mixture of peptides is called "tryptic peptides" and it's artificially created by this process. Those peptides (protein fragments) are not present in the physiological conditions in urine. It is in principle possible, that a protein can by digested in vivo in human urinary tract with other proteases. However, such proteins will have a different digestion pattern and peptides with a non-specific tryptic sequence are not included in panel analysis in the methods of the present invention.

EXAMPLES

Example 1. Urinary Proteomic Markers for Membranous Nephropathy (MN)

Methods

This study included patients with biopsy-proven MN (25) and healthy controls (7). Urine samples were obtained from a midstream of the second- or third-morning (SPOT) sample. The samples were processed up to 2 h after collection and stored at −80° C. for further measurements with MS. The results were related to demographic data, standard laboratory tests and GFR estimated with use of Chronic Kidney Disease Epidemiology Collaboration (CKD-EPI) equation.

Results

Figure 1:
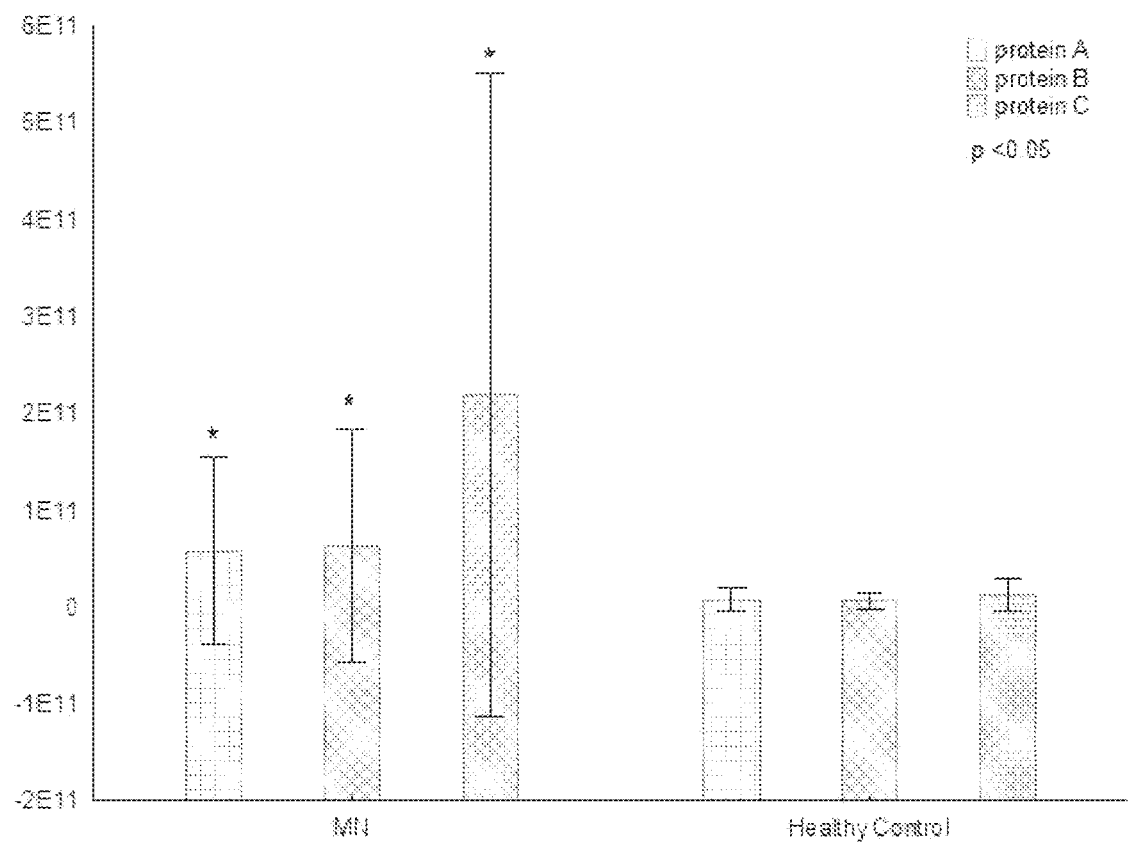
FIG. 1 shows Signal intensity (Mean±SD) of A1BG, ORM-1 and TF in SPOT urine samples. Protein A=A1BG, Protein B=ORM-1, Protein C=TF.

The signal intensity from A1BG, ORM-1, FTL and TF was found to be higher in MN patients than in controls. According to MS, MN patients had significantly ($p<0.05$) elevated signal of A1BG, ORM-1 and TF comparing to controls (FIG. 1). Mass spectrometry, according to the specific amino-acids fragments of each tested protein, confirmed the differences between tested and control group. Additionally, statistically significant differences exist between patients with different types of glomerulonephritides.

The signal intensity of A1BG, ORM-1, FTL and TF are elevated in MN and vary depending on types of nephropathies. This observation suggests their differential roles in the pathophysiology of the given disease, and its possible application as a non-invasive diagnostic and prognostic marker.

Example 2. Correlation of ΔGFR and a Protein Marker

ΔGFR (change in glomerular filtration rate, calculated as: (current GFR−initial GFR)/observation years) was estimated for several patients and its relation to various analysed protein marker levels as estimated by MS was analysed.

Figure 2:
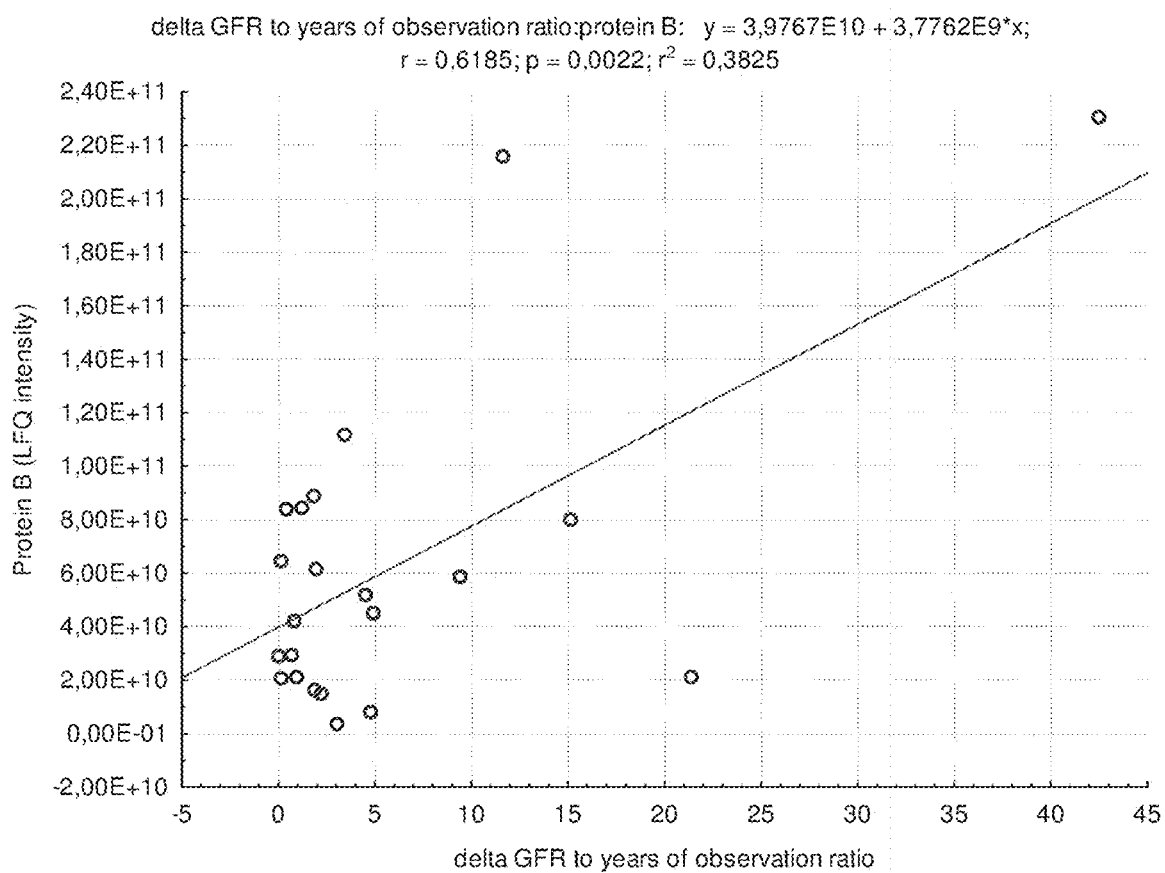
FIG. 2 shows delta GFR to years of observation vs. ORM1 level (indicated as protein B).
Figure 3A:
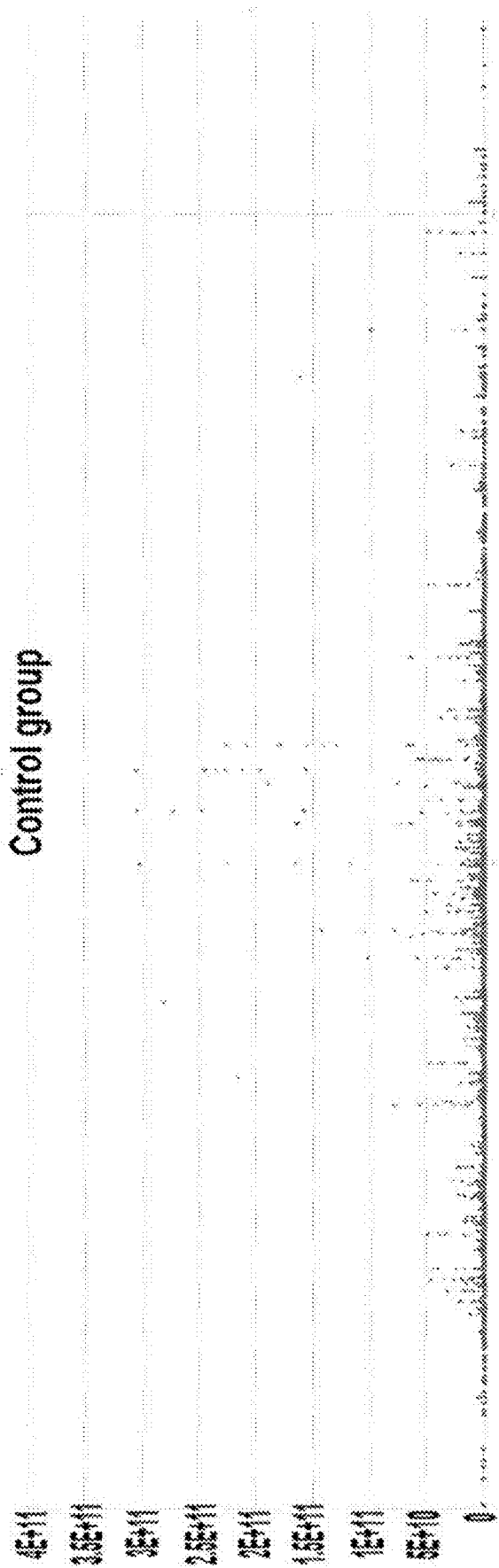
FIG. 3 shows a proteinogram for MS measurements for a control group (FIG. 3A), patients with IgAN (FIG. 3B), patients with MN (FIG. 3C) and patients with LS (FIG. 3D)
FIG. 3E shows a comparison of proteinogram patterns for the control group and the three glomerulopathies as above.
FIG. 3F shows a comparison of proteinogram patterns on a smaller scale and without demonstrating the full results for albumin in order to better visualize differing patterns between conditions.
Figure 3B:
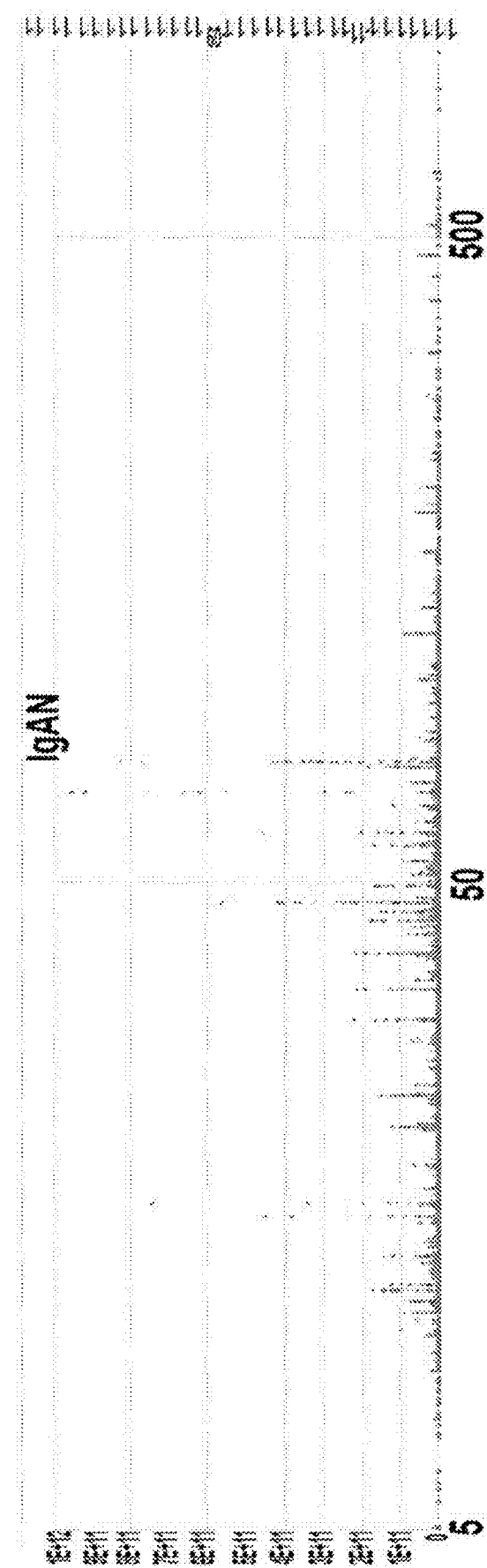
Figure 3C:
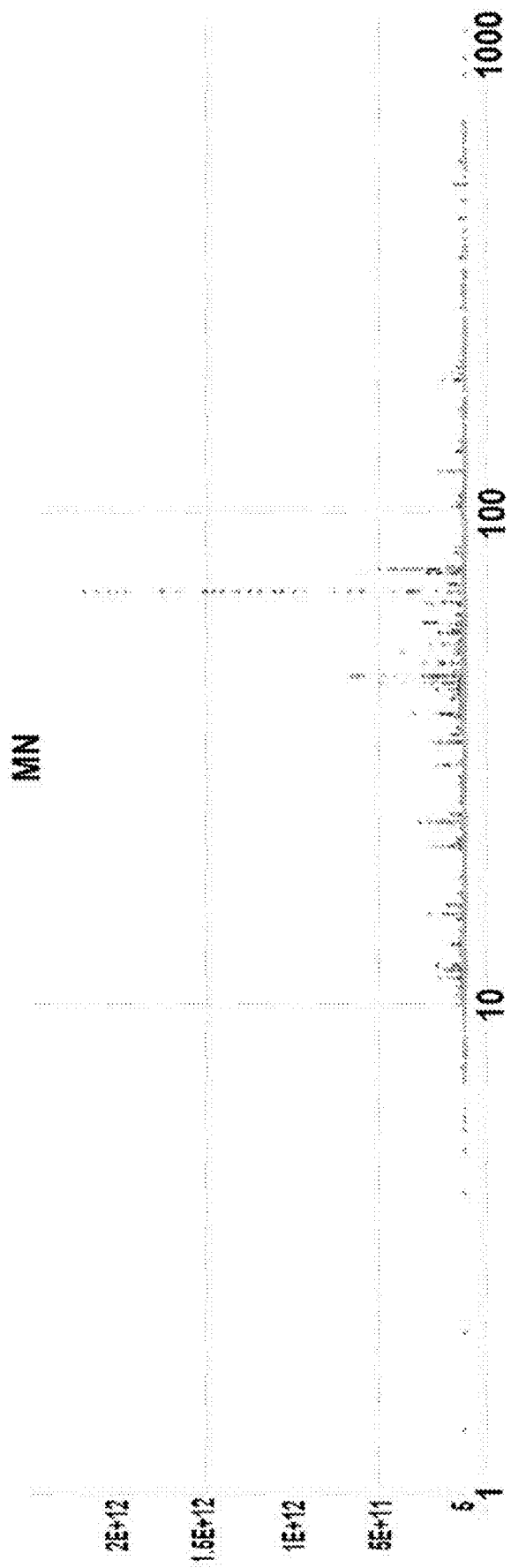
Figure 3D:
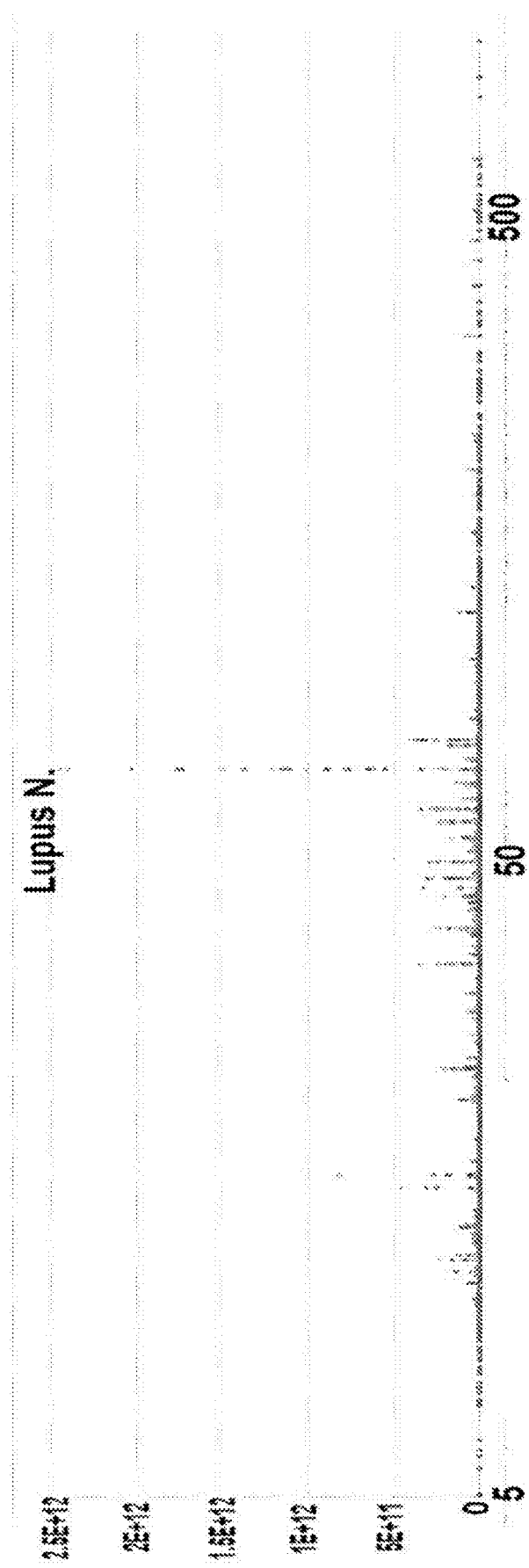
Figure 3E:
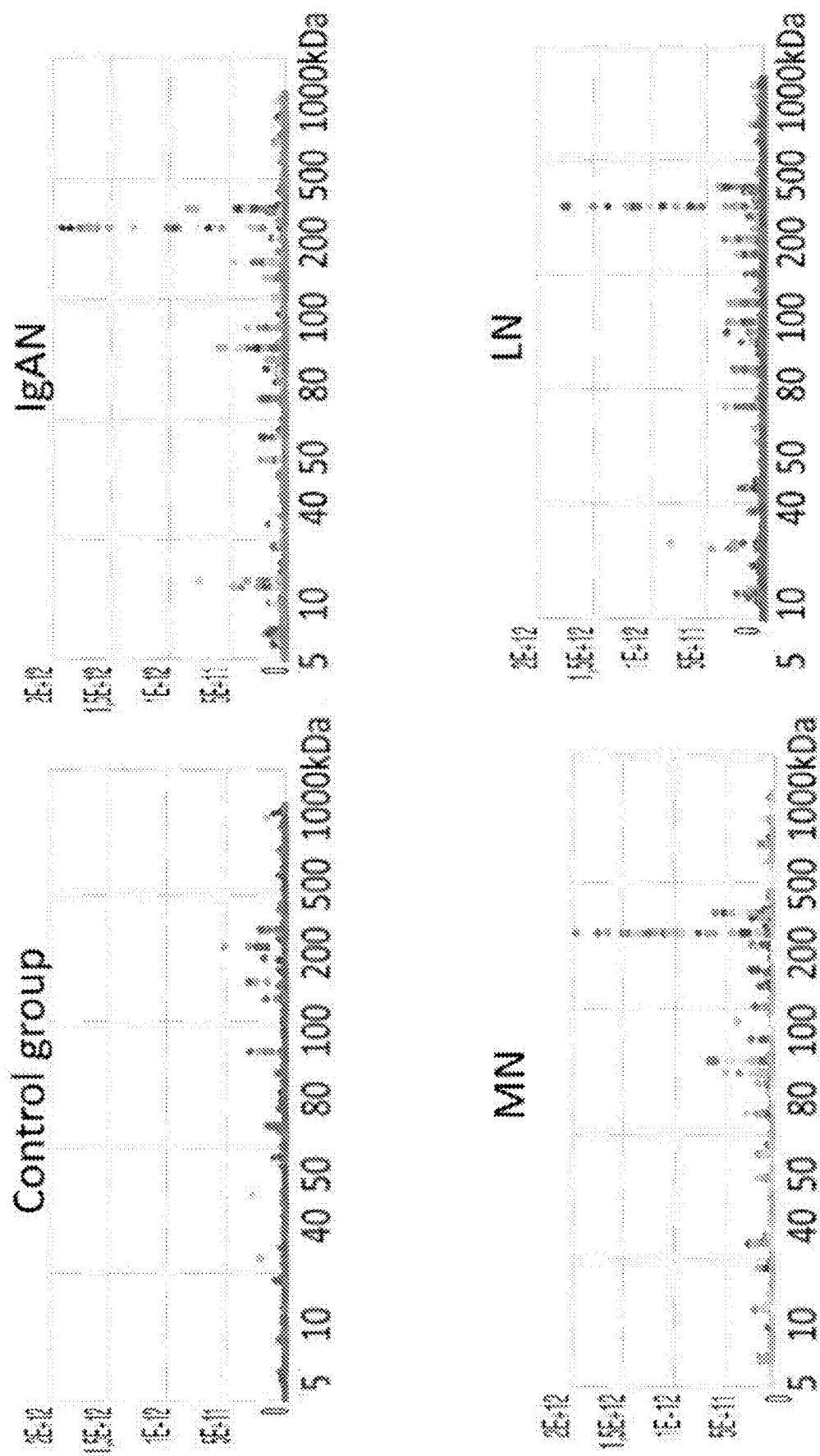
Figure 3F:
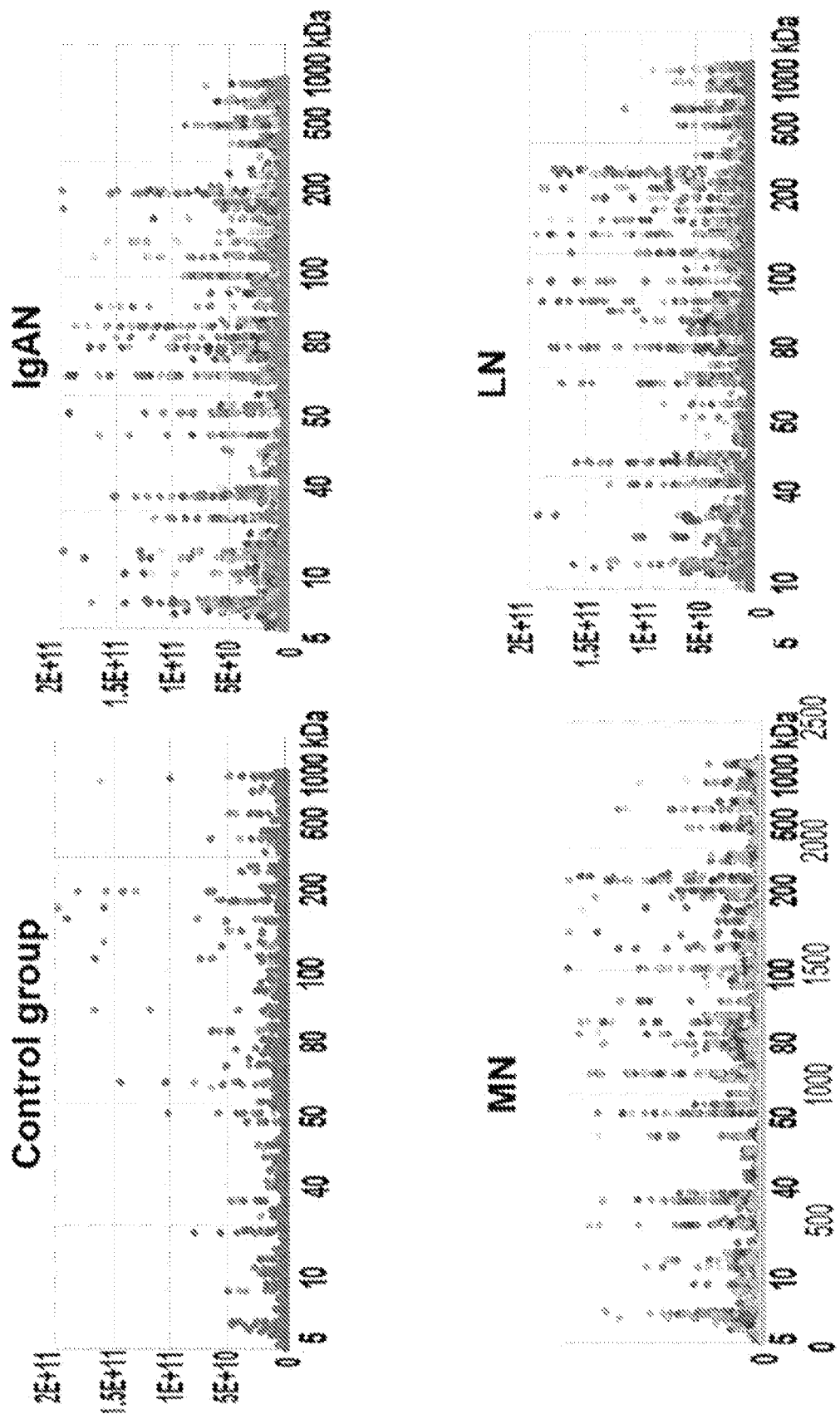

An exemplary result is shown on FIG. 2. FIG. 2 demonstrates that ORM1 level (indicated as protein B) as measured by MS in a urine sample may correlate with high ΔGFR. This suggests that a protein marker (such as ORM1) may indeed by utilized as a readily available and quicker prognostic tool, enabling estimation and prognosis of the rate in change in glomerular filtration rate for a given patient).

Example 3. Larger Scale Screening

For preliminary analysis samples from 84 patients were used. The samples were prepared and measured according to a modified, improved protocol to the one disclosed in Krzysztof Mucha, Bartosz Foroncewicz, Leszek Pgczek, How to diagnose and follow patients with glomerulonephritis without kidney biopsy?. Polskie Archiwum Medycyny Wewnetrznej, 2016, 126(7-8):471-473.

Briefly, samples were collected from all individuals according to a uniform study protocol, following the recommendations on urine proteomic sample collection. The second- or third morning midstream urine was collected to sterile urine containers 1 to 3 h after previous urination.

Sample Preparation:

Steps 1-4 are performed to concentrate protein/desalt/remove lipids and small organic/inorganic molecules.

1. 200 ul of a urine sample is transferred to Vivavon 500 Hydrosart spin-unit 10 MWCO filter.
2. The sample is centrifuge at the highest possible speed (14 kG) at 20 C for 30 minutes to achieve the fastest concentration also to avoid protein degradation. Flow-through is discarded.
3. 200 ul of 8M solution of urea in 100 mM TEAB (Triethylammonium bicarbonate, Thermo #90114) is added to sample and spin for 20 minutes 14 kG, 20 C. The step is done twice. 4. Flow-through is discarded and 1.5 ml tube is replaced with a new one.

Protein Digestion:

1. The mix of enzymes LysC/Trypsin (Promega V5071) 20 ug per unit is solubilized in 500 ul of 8M solution of urea in 100 mM TEAB.
2. 50 ul of the solution was added to the spin unit and incubated for 5 hours at 37 C with mild shaking (70 rpm). LysC is a protease which cleaves peptide bond at C-side of lysine in a peptide. It has a unique ability to stay enzymatically active in denaturing conditions such as high urea concentration. It allows us to achieve higher peptide coverage thanks to the digestion of unfolded proteins.
3. After 5 h incubation to each sample 400 ul of 100 mM TEAB solution was added to dilute urea bellow 1M, which allows trypsin to be enzymatically active. Samples are digested overnight at 37 C with mild shaking.
4. Filtrating units are spin at 14 kG for 30 minutes at 20 C.
5. 200 ul of 0.1 M NaCl in 100 mM TEAB is added and samples are spin at 14 kG for 30 minutes at 20 C.
6. 10 ul of 5% formic acid solution is added to stop digestion.

Peptides Desalting:

1. Final peptide solution from step 9 is transferred to Oasis HLB 96 well-plate (Waters, 186000128).
2. Peptides are concentrated at HLB sorbent at manifold pressure (15 kPa for 3 minutes).
3. The sorbent is washed twice with 0.1% TFA solution.
4. Peptides are eluted in two steps: 200 ul of methanol, 200 ul of 80% acetonitrile/20% water.
5. Peptide solution is evaporated to dryness with Speed-Vac.

Mass Spectrometry

MS analysis was performed by LC-MS in the Laboratory of Mass Spectrometry (IBB PAS, Warsaw) using a nanoAcquity UPLC system (Waters) coupled to an Orbitrap QExactive mass spectrometer (Thermo Fisher Scientific). The resulting peptide mixtures were applied to RP-18 pre-column (Waters, Milford, MA) using water containing 0.1% TFA as a mobile phase and then transferred to a nano-HPLC RP-18 column (internal diameter 75 μM, Waters, Milford MA) using ACN gradient (0-35% ACN in 180 min) in the presence of 0.1% FA at a flow rate of 250 nl/min. The column outlet was coupled directly to the ion source of Orbitrap QExative mass spectrometer (Thermo Electron Corp., San Jose, CA) working in the regime of data-dependent MS to MS/MS switch and data were acquired in the m/z range of 300-2000 The mass spectrometer was operated in the data-dependent MS2 mode, and data were acquired in the m/z range of 100-2000. Peptides were separated by a 180 min linear gradient of 95% solution A (0.1% formic acid in water) to 45% solution B (acetonitrile and 0.1% formic acid). The measurement of each sample was preceded by three washing runs to avoid cross-contamination. Data were analyzed with the Max-Quant (Version 1.6.3.4) platform using mode match between runs (Cox and Mann, 2008)

Results

The goal of the data analysis was to assess the feasibility of a two-step model based on the MS data able to: (a) discriminate between patients and control group; (b) discriminate between disorders affecting patients. MS measurements covered 84 patients: 30 IgAN patients; 20 MN patients; 26 LN patients and 8 healthy controls. During the analysis, the focus was on IgAN, MN and LN patients, as the control group was separated from others. 2510 proteins were identified at 5% FDR (False Discovery Rate). In order to reduce the number of false positive identifications, a threshold of 0.1% was assumed with FDR resulting in 1659 proteins.

For each of the 1659 proteins considered in the MS analysis, W test statistic was computed (as per Wilcoxon test) for pairwise comparisons between patient groups (IgAN, MN, LN) and control group. Due to the preliminary character of the test, bootstrapped W values were not used.

The proteinograms showed distinct patterns, differentiating the control group from particular glomerulopathies (FIG. 3). FIGS. 3A-D show the proteinogram patterns obtained for the four groups (control—A, IgAN—B, MN—C, LS—D). Each dot colour corresponds to a different patient. The protein with the highest levels in all graphs is serum albumin, which is a more universal marker for proteinuria. FIG. 3E shows a comparison of patterns for all four groups, while FIG. 3F shows the comparison on a smaller scale without displaying the top values for serum albumin in order to better visualize the differences between the groups.

It is clearly visible that the proteinogram patterns can be used for reliable differentiation between groups and for identification of a particular glomerulopathy.

The results were further analysed in order to identify the most useful markers to be employed in screening procedures. The proteins found to be suitable for the discrimination between patients and healthy controls and differentiation between the particular diseases are listed in Table 1 below.

TABLE 1

Proteins suitable for detection and differentiation of CKDs

| T: Gene names | T: Majority protein IDs | T: Protein names |
|---|---|---|
| ALB | P02768-1 | Serum albumin |
| CP | P00450 | Ceruloplasmin |
| TF | P02787 | Serotransferrin |
| A1BG | P04217 | Alpha-1B-glycoprotein |
| ORM1 | P02763 | Alpha-1-acid glycoprotein 1 |
| IGHG2 | A0A286YEY4 | Ig gamma-2 chain C region |
| F2 | P00734 | Prothrombin; Activation peptide fragment 1; Activation peptide fragment 2; Thrombin light chain; Thrombin heavy chain |
| ORM2 | P19652 | Alpha-1-acid glycoprotein 2 |
| SERPINA1 | P01009 | Alpha-1-antitrypsin; Short peptide from AAT |
| AZGP1 | P25311 | Zinc-alpha-2-glycoprotein |
| CNDP1 | Q96KN2 | Beta-Ala-His dipeptidase |
| SERPINA6 | P08185 | Corticosteroid-binding globulin |
|  | P01780 | Ig heavy chain V-III region JON |
| AFM | P43652 | Afamin |
| IGHV3-21 | A0A0B4J1V1 |  |
| TTR | P02766 | Transthyretin |
| ITIH2 | Q5T985 | Inter-alpha-trypsin inhibitor heavy chain H2 |
| HPX | P02790 | Hemopexin |
| HP | P00738 | Haptoglobin; Haptoglobin alpha chain; Haptoglobin beta chain |
| CD59 | E9PNW4 | CD59 glycoprotein |
| A2M | P01023 | Alpha-2-macroglobulin |
| GC | D6RF35 | Vitamin D-binding protein |
| LYNX1 | P0DP57 |  |
| GM2A | P17900 | Ganglioside GM2 activator; Ganglioside GM2 activator isoform short |
|  | Q1RMN8 |  |
| SERPINC1 | P01008 | Antithrombin-III |
| SLURP1 | P55000 | Secreted Ly-6/uPAR-related protein 1 |
| C3 | P01024 | Complement C3; Complement C3 beta chain; C3-beta-c; Complement C3 alpha chain; C3a anaphylatoxin; Acylation stimulating protein; Complement C3b alpha chain; Complement C3c alpha chain fragment 1; Complement C3dg fragment; Complement C3g fragment; Complement C3d fragment; Complement C3f fragment; Complement C3c alpha chain fragment 2 |
| IGLL5 | A0A0B4J231 | Immunoglobulin lambda-like polypeptide 5; Ig lambda-1 chain C regions |
| CPN1 | P15169 | Carboxypeptidase N catalytic chain |
| CD55 | H7BY55 | Complement decay-accelerating factor |
| IGHG3 | P01860 | Ig gamma-3 chain C region |
| IGHV5-51 | A0A0C4DH38 |  |
| LEAP2 | Q969E1 | Liver-expressed antimicrobial peptide 2 |
| GRN | P28799 | Granulins; Acrogranin; Paragranulin; Granulin-1; Granulin-2; Granulin-3; Granulin-4; Granulin-5; Granulin-6; Granulin-7 |
| PGM1 | P36871 | Phosphoglucomutase-1 |
| PON1 | P27169 | Serum paraoxonase/arylesterase 1 |
| C4B | P0C0L5 | Complement C4-B; Complement C4 beta chain; Complement C4-B alpha chain; C4a anaphylatoxin; C4b-B; C4d-B; Complement C4 gamma chain |
|  | P01619 | Ig kappa chain V-III region B6 |
| VTA1 | Q9NP79 | Vacuolar protein sorting-associated protein VTA1 homolog |
| VASN | Q6EMK4 | Vasorin |
| TCP1 | P17987 | T-complex protein 1 subunit alpha |
| IGHV3-66 | A0A0C4DH42 |  |
| IGKV2D-28 | A0A075B6P5 | Ig kappa chain V-II region FR |
|  | A0A0G2JMB2 |  |
| GPLD1 | P80108 | Phosphatidylinositol-glycan-specific phospholipase D |
| LRG1 | P02750 | Leucine-rich alpha-2-glycoprotein |
| PSAP | P07602 | Prosaposin; Saposin-A; Saposin-B-Val; Saposin-B; Saposin-C; Saposin-D |
| SERPINA3 | P01011 | Alpha-1-antichymotrypsin; Alpha-1-antichymotrypsin His-Pro-less |
| IGKC | P01834 | Ig kappa chain C region |
| ACO1 | P21399 | Cytoplasmic aconitate hydratase |
| MB | P02144 | Myoglobin |
| DCXR | Q7Z4W1 | L-xylulose reductase |
| PGLYRP2 | Q96PD5 | N-acetylmuramoyl-L-alanine amidase |
| WFDC2 | Q14508 | WAP four-disulfide core domain protein 2 |
| GOT1 | P17174 | Aspartate aminotransferase, cytoplasmic |
|  | P01624 | Ig kappa chain V-III region POM |
| NAP1L4 | C9JZI7 | Nucleosome assembly protein 1-like 4 |
| HBA1 | P69905 | Hemoglobin subunit alpha |
| FOLR1 | P15328 | Folate receptor alpha |

TABLE 1-continued

Proteins suitable for detection and differentiation of CKDs

| T: Gene names | T: Majority protein IDs | T: Protein names |
|---|---|---|
| LAMC1 | P11047 | Laminin subunit gamma-1 |
| SERPINA7 | P05543 | Thyroxine-binding globulin |
|  | P04432 | Ig kappa chain V-I region Daudi; Ig kappa chain V-I region DEE |
| TFF2 | Q03403 | Trefoil factor 2 |
| PDCD6IP | Q8WUM4 | Programmed cell death 6-interacting protein |
| TFF1 | P04155 | Trefoil factor 1 |
| IGKV1-5 | P01602 | Ig kappa chain V-I region HK102 |
| IGHG1 | A0A0A0MS08 | Ig gamma-1 chain C region |
| APOA1 | P02647 | Apolipoprotein A-I; Proapolipoprotein A-I; Truncated apolipoprotein A-I |
| HINT1 | P49773 | Histidine triad nucleotide-binding protein 1 |
| FZD4 | Q9ULV1 | Frizzled-4 |
| IGLV3-10 | A0A075B6K4 |  |
| FAM3B | A8MTF8 | Protein FAM3B |
| IL10RB | H0Y3Z8 | Interleukin-10 receptor subunit beta |
| CLSTN1 | Q5SR54 | Calsyntenin-1; Soluble Alc-alpha; CTF1-alpha |
| PPIB | P23284 | Peptidyl-prolyl cis-trans isomerase B |
| TIMP2 | P16035 | Metalloproteinase inhibitor 2 |
| RNASE1 | P07998 | Ribonuclease pancreatic |
| FBN1 | P35555 | Fibrillin-1 |
| PDCD6 | O75340 | Programmed cell death protein 6 |
| NT5C | Q8TCD5 | 5(3)-deoxyribonucleotidase, cytosolic type |
| IGKV3D-11 | A0A0A0MRZ8 | Ig kappa chain V-III region VG |
| IGHM | A0A1B0GUU9 | Ig mu chain C region |
| SHMT1 | P34896 | Serine hydroxymethyltransferase, cytosolic |
| S100A7 | P31151 | Protein S100-A7 |
| LGALS3 | P17931 | Galectin-3; Galectin |
| IGHV4-61 | A0A0C4DH41 | Ig heavy chain V-II region NEWM |
| UMOD | X6RBG4 | Uromodulin; Uromodulin, secreted form |
| BCAM | A0A087WXM8 | Basal cell adhesion molecule |
| FAT4 | Q6V0I7 | Protocadherin Fat 4 |
| HBB | P68871 | Hemoglobin subunit beta; LVV-hemorphin-7; Spinorphin |
| CMBL | Q96DG6 | Carboxymethylenebutenolidase homolog |
| CUTA | O60888 | Protein CutA |
| PCDHGC3 | Q9UN70 | Protocadherin gamma-C3 |
| ENPP2 | Q13822 | Ectonucleotide pyrophosphatase/phosphodiesterase family member 2 |
| CD300A | Q9UGN4 | CMRF35-like molecule 8 |
| GLO1 | Q04760 | Lactoylglutathione lyase |
| GPC4 | O75487 | Glypican-4; Secreted glypican-4 |
| RNF13 | O43567 | E3 ubiquitin-protein ligase RNF13 |
| NHLC3 | Q5JS37 | NHL repeat-containing protein 3 |

Figure 4:
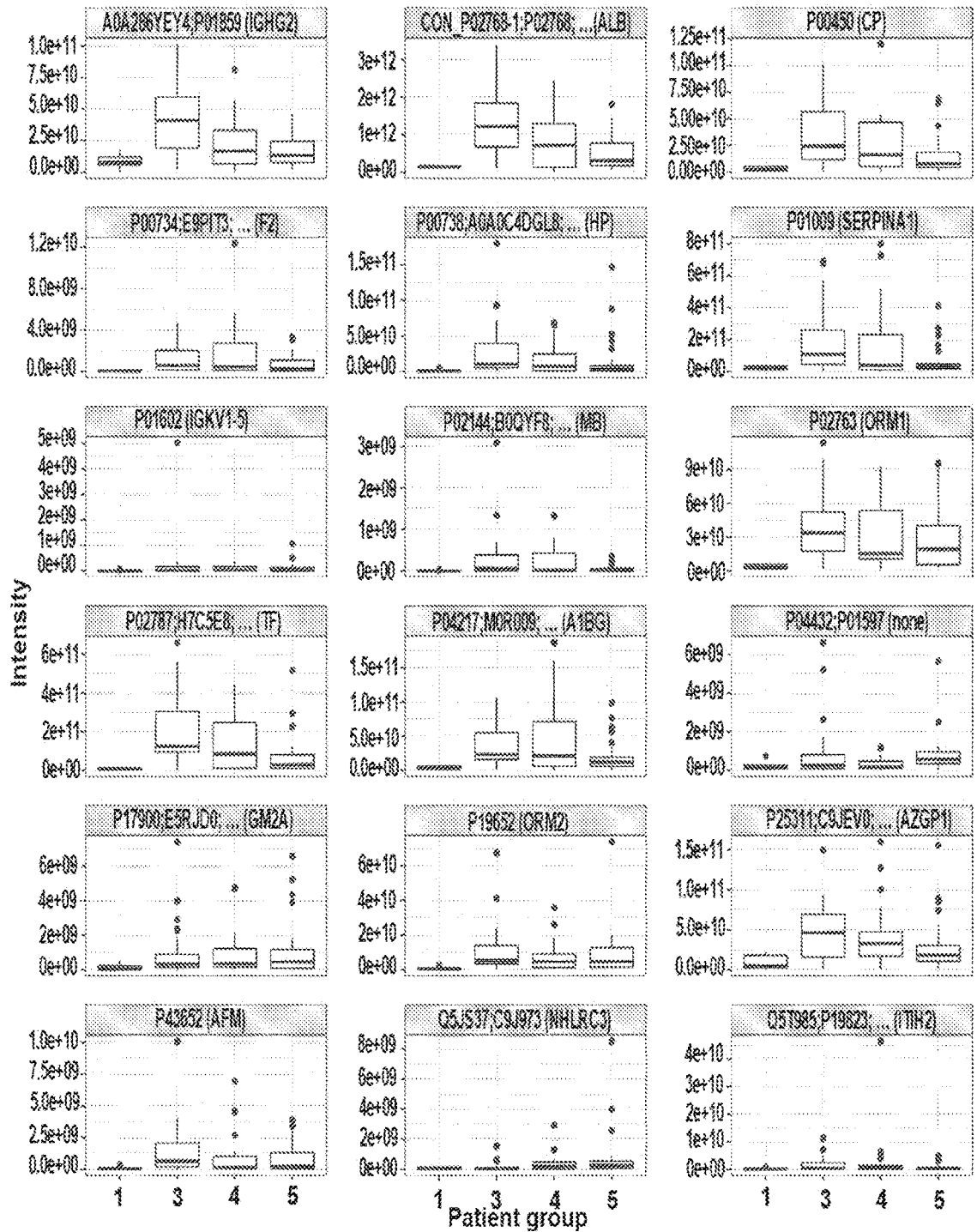
FIG. 4 shows a comparison of the most extreme (most discriminating) proteins obtaining 18 unique proteins, as found for patients from groups 1=control, 3=IgAN, 4=MN and 5=LN as the control group was separated from others.

For each comparison, ten of the most extreme (most discriminating) proteins were taken obtaining 18 unique proteins (FIG. 4).

Figure 5:
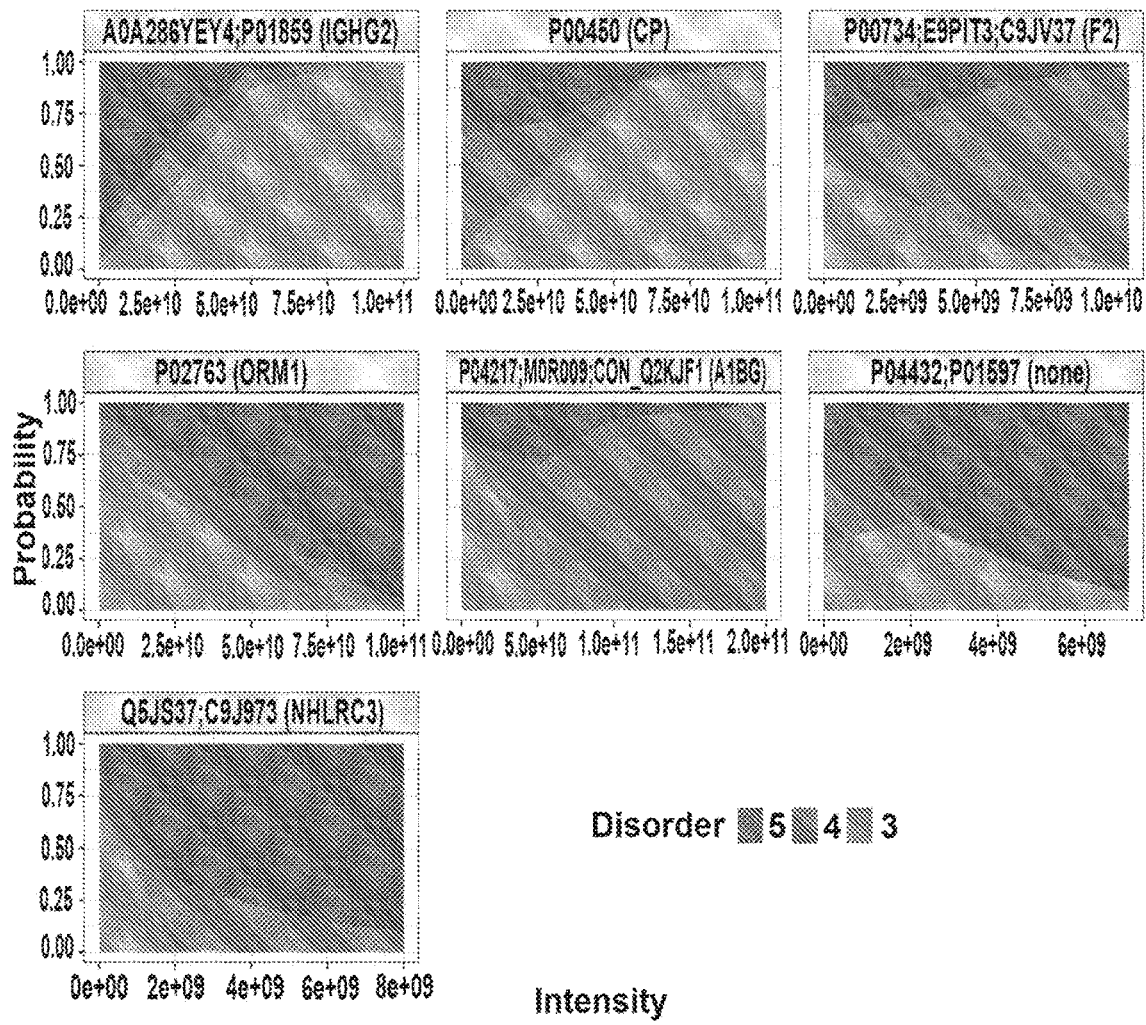
FIG. 5 shows a model employing seven proteins (groups 3=IgAN, 4=MN and 5=LN).
Figure 6:
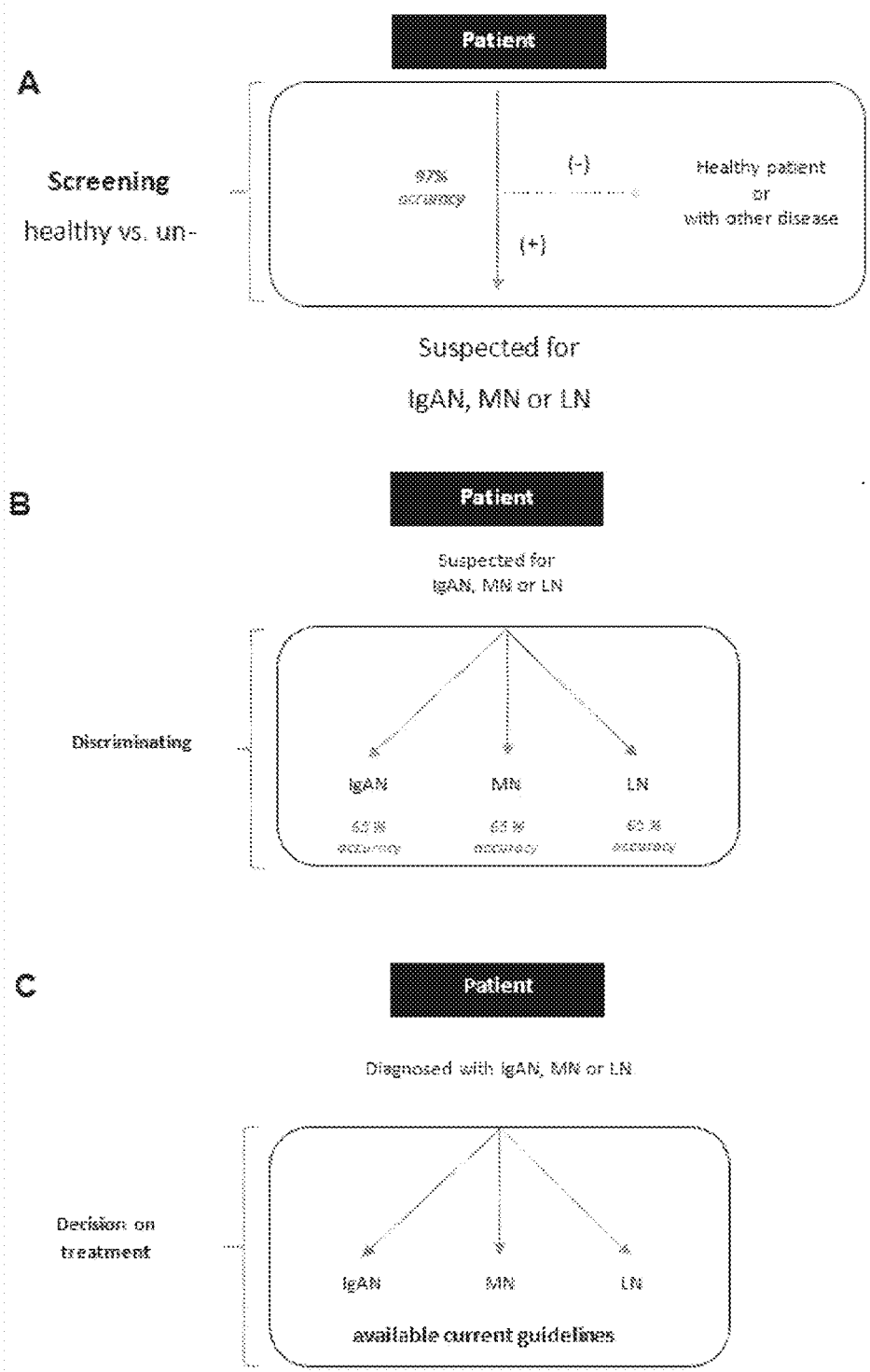
FIG. 6 shows an illustrative diagnostic scheme for the present methods. Panel A. Screening, panel B. Discrimination between IgAN, MN or LN, panel C. Decision making after establishing diagnosis.

Using selected proteins a multinomial log-linear models were built via neural networks (Venables W N, Ripley B. D. (2002) Modern Applied Statistics with S. Fourth edition. Springer) The full model was optimized, covering all 18 proteins, considering the Akaike Information Criterion. The resulting model employed seven proteins. Higher order effects of proteins were computed in the model to assess how intensity produced by the MS experiments affects the probability of specific disorders (FIG. 5) (Fox J, Hong J. Effect displays in R for multinomial and proportional-odds logit models: Extensions to the effects package. Journal of Statistical Software 2009. 32:1; 1-24). For example, for P00450 (gene name CP), for lower intensities, a patient has the highest probability of being in group 4 (MN). On the other hand, for the highest possible values of intensities, the most probable group is 3 (IgAN).

Probabilities were additionally converted to discrete predictions (Table 2).

TABLE 2

Predictions, based on measured intensity for particular proteins (group 3 = IgAN, group 4 = MN, group 5 = LN)

| Protein (gene) | Intensity | Patient group |
|---|---|---|
| A0A286YEY4; P01859 (IGHG2) | <1e+06 | 5 |
| A0A286YEY4; P01859 (IGHG2) | 1e+06-3e+10 | 3 |
| A0A286YEY4; P01859 (IGHG2) | 3e+10-5e+10 | 3 |
| A0A286YEY4; P01859 (IGHG2) | 5e+10-8e+10 | 3 |
| A0A286YEY4; P01859 (IGHG2) | 8e+10-1e+11 | 3 |
| P00450 (CP) | <1e+07 | 4 |
| P00450 (CP) | 1e+07-3e+10 | 3 |
| P00450 (CP) | 3e+10-6e+10 | 3 |
| P00450 (CP) | 6e+10-9e+10 | 3 |
| P00450 (CP) | 9e+10-1e+11 | 3 |
| P00734; E9PIT3; C9JV37 (F2) | <0 | 3 |
| P00734; E9PIT3; C9JV37 (F2) | 0-3e+09 | 4 |
| P00734; E9PIT3; C9JV37 (F2) | 3e+09-6e+09 | 4 |
| P00734; E9PIT3; C9JV37 (F2) | 6e+09-9e+09 | 4 |
| P00734; E9PIT3; C9JV37 (F2) | 9e+09-1e+10 | 4 |
| P02763 (ORM1) | <4e+06 | 3 |
| P02763 (ORM1) | 4e+06-3e+10 | 3 |
| P02763 (ORM1) | 3e+10-6e+10 | 5 |
| P02763 (ORM1) | 6e+10-9e+10 | 5 |
| P02763 (ORM1) | 9e+10-1e+11 | 5 |

TABLE 2-continued

Predictions, based on measured intensity for particular proteins (group 3 = IgAN, group 4 = MN, group 5 = LN)

| Protein (gene) | Intensity | Patient group |
|---|---|---|
| P04217; M0R009; CON_Q2KJF1 (A1BG) | <3e+05 | 3 |
| P04217; M0R009; CON_Q2KJF1 (A1BG) | 3e+05-5e+10 | 4 |
| P04217; M0R009; CON_Q2KJF1 (A1BG) | 5e+10-9e+10 | 4 |
| P04217; M0R009; CON_Q2KJF1 (A1BG) | 9e+10-1e+11 | 4 |
| P04217; M0R009; CON_Q2KJF1 (A1BG) | 1e+11-2e+11 | 4 |
| P04432; P01597 (none) | <0 | 4 |
| P04432; P01597 (none) | 0-2e+09 | 5 |
| P04432; P01597 (none) | 2e+09-3e+09 | 5 |
| P04432; P01597 (none) | 3e+09-5e+09 | 5 |
| P04432; P01597 (none) | 5e+09-7e+09 | 5 |
| Q5JS37; C9J973 (NHLRC3) | <0 | 3 |
| Q5JS37; C9J973 (NHLRC3) | 0-2e+09 | 5 |
| Q5JS37; C9J973 (NHLRC3) | 2e+09-4e+09 | 5 |
| Q5JS37; C9J973 (NHLRC3) | 4e+09-6e+09 | 5 |
| Q5JS37; C9J973 (NHLRC3) | 6e+09-8e+09 | 5 |

The current model in 97% of cases differentiates between the control group and afflicted patients. Moreover, in 65.79% of cases it is able to accurately distinguish between diseases (IgAN, MN and LN). This data shows that the label-free proteomics approach enables to perform semi quantitative analysis on the basis of which proteins can be selected for further verification by means of targeted proteomics. There was very high repeatability and consistency of the data for the samples (highest to lowest: control, IgAN, MN, LN).

Among the protein markers found to be the strongest diagnostic or differentiating factors, there were no significant sequence similarities or homology. However, a large number of the selected markers share some analogous structural features, such as Ig-like domains. This is a type of protein domain that consists of a 2-layer sandwich of 7-9 antiparallel 3-strands arranged in two 3-sheets with a Greek key topology. This type of domains are found in hundreds of proteins of different functions. However, the protein markers found to be the most useful diagnostic factors in the study described above, were strikingly similar in the localization of their Ig-like domains and disulphide bridges, showing structural similarity despite varied amino acid sequences. Many of the selected markers have a function related to neutrophil degranulation and/or blood platelets functions.

Example 4. Development of a Diagnostic Model

The model obtained in Example 3 was built for the second, hardest step of the analysis and differentiates between three disorders affecting patients. The rational panel design suggests limiting the amount of involved proteins. Therefore the present inventors endeavored to develop a simpler model, discriminating between the control group and patients.

To model the relationship between the status of a patient (control/afflicted) and intensities of measured proteins, a generalized linear model (GLM) was used with a binomial error distribution and the logit link function (McCullagh P. and Nelder, J. A. (1989) Generalized Linear Models. London: Chapman and Hall). The final linear model was constructed using the backward AIC-based selection of variables (Venables, W. N. and Ripley, B. D. (2002) Modern Applied Statistics with S. Fourth edition. Springer).

Further analysis of protein profile obtained in the aforementioned screening studies, permitted the isolation of at least eight potential candidate proteins, which in the most perfect way can be used to investigate the pathophysiology IgAN. Research on the role of these 8 proteins, previously unpublished, can be a basis for a novel diagnostic method. The final model, capable of reliably distinguishing between the control group and patients involves the following 5 proteins:

P02768 (ALB, Serum albumin), measured intensity indicated herein as $x_1$;
P01009 (serpina1, Alpha-1-antitrypsin), measured intensity indicated herein as $x_2$;
P02763 (ORM1, Alpha-1-acid glycoprotein 1), measured intensity indicated herein as $x_3$;
P02787 (TF, Serotransferrin), measured intensity indicated herein as $x_4$;
P04155 (TFF1, Trefoil factor 1), measured intensity indicated herein as $x_5$.

Deviance Residuals:
Min 1Q Median 3Q Max
1.165e-03 2.000e-08 2.000e-08 2.000e-08 6.337e-04
Coefficients:

|  | Estimate | Std. Error | Z value | Pr(>|z|) |
|---|---|---|---|---|
| (Intercept) | 1.72E+01 | 1.57E+03 | 0.011 | 0.991 |
| x1 | −5.76E−10 | 2.83E−08 | −0.02 | 0.984 |
| x2 | −9.38E−09 | 6.30E−07 | −0.015 | 0.988 |
| x3 | 1.33E−08 | 1.07E−06 | 0.012 | 0.99 |
| x4 | 2.56E−08 | 1.15E−06 | 0.022 | 0.982 |
| x5 | 4.03E−07 | 5.01E−05 | 0.008 | 0.994 |

(Dispersion parameter for binomial family taken to be 1)
Null deviance: 5.2835e+01 on 83 degrees of freedom
Residual deviance: 2.4935e-06 on 78 degrees of freedom
AIC: 12
Number of Fisher Scoring iterations: 25

The best model (with the best value of AIC criterion) involved the level of five proteins:

$$p(\text{afflicted}) = \frac{\exp(E)}{1 + \exp(E)}$$

$$E = 17.205 - 5.7580 \times 10^{-10} \times x_1 - 9.3798 \times 10^{-9} \times x_2 + 1.3297 \times 10^{-8} \times x_3 + 2.5638 \times 10^{-8} \times x_4 + 4.0311 \times 10^{-7} \times x_5$$

Where:
$x_1$: ALB
$x_2$: SERPINA1
$x_3$: ORM1
$X_4$: TF
$x_5$: TFF1

The model was validated using the jackknife (leave-one-out) test yielding following performance measures:

| Area under the curve | True Positive | False Positive | True Negative | False Negative |
|---|---|---|---|---|
| 0.9786 | 73 | 0 | 8 | 3 |

The probability of the disease can therefore be calculated using the following formula:

$$p(\text{disease}) = \frac{\exp(E)}{(1 + \exp(E))}$$

wherein:

$E = 17.204550857965 - 5.75799550569336*10^{-10}*x_1 - 9.37976121221068*10^{-9}*x_2 + 1.32966288022553*10^{-8}*x_3 + 2.5638225555611*10^{-8}*x_4 + 4.03113433888467*10^{-7}*x_5.$

Example 5. Diagnostic Approach

Coded urine samples derived from patients are analysed using MS and levels of five protein markers are evaluated. The analysed markers were serum albumin (ALB; P02768); alpha-1-antitrypsin (serpina1; P01009); alpha-1-acid glycoprotein 1 (ORM1; P02763); serotransferrin (TF; P0278) and Trefoil factor 1 (TFF1; P04155).

The formula $$p(\text{disease}) = \frac{\exp(E)}{(1 + \exp(E))}$$

wherein:

$E = 17.204550857965 - 5.75799550569336*10^{-10}*x_1 - 9.37976121221068*10^{-9}*x_2 + 1.32966288022553*10^{-8}*x_3 + 2.5638225555611*10^{-8}*x_4 + 4.03113433888467*10^{-7}*x_5;$ wherein $x_1$ is the determined level for serum albumin (ALB; P02768); $x_2$ is the determined level for alpha-1-antitrypsin (serpina1; P01009); $x_3$ is the determined level for alpha-1-acid glycoprotein 1 (ORM1; P02763); $x_4$ is the determined level for serotransferrin (TF; P0278); $x_5$ is the determined level for trefoil factor 1 (TFF1; P04155), was used to calculate the probability for each sample of being derived from the subject having or being at a risk of chronic kidney disease or glomerulopathy.

For the samples classified as derived from subjects having or being at a risk of chronic kidney disease or glomerulopathy, a further classification was performed, in order to divide them in groups corresponding to a specific condition.

Figure 7:
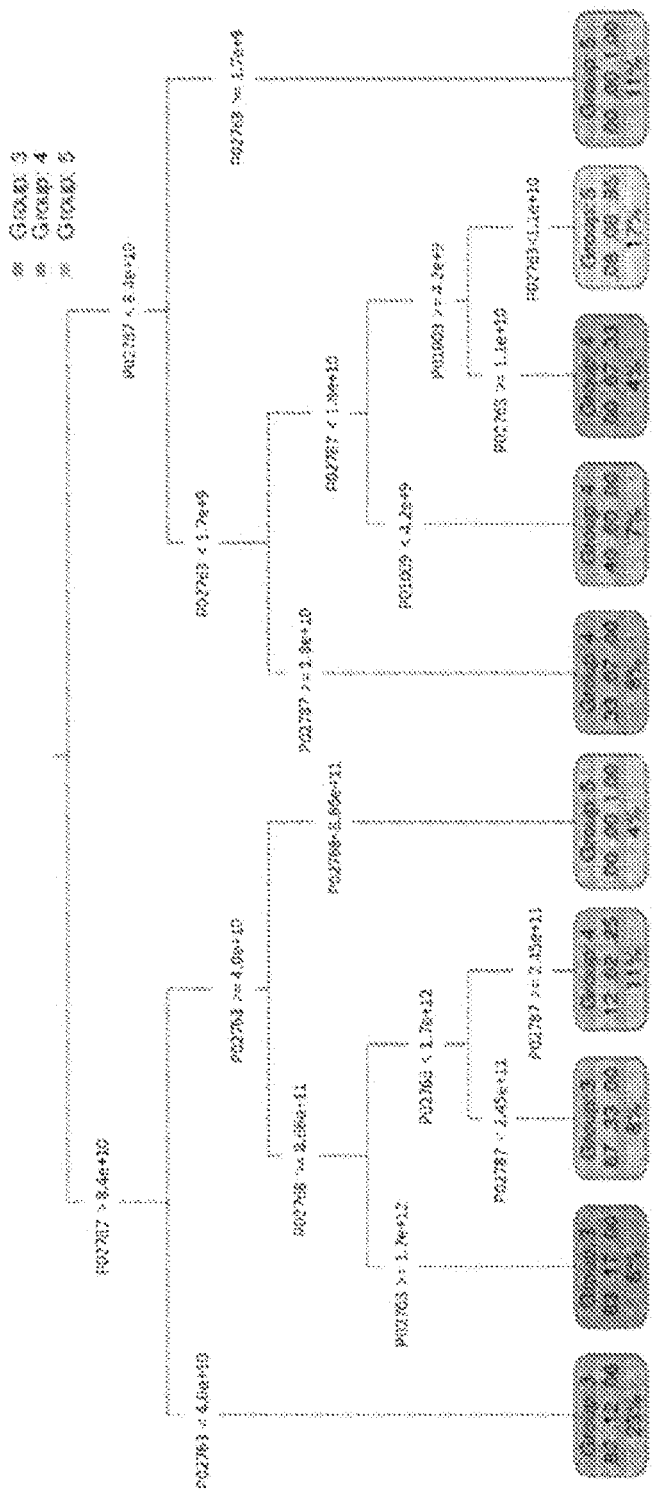
FIG. 7 shows a decision tree allowing estimating probability of different glomerulopathies, based on measured levels of the measured protein markers in a urine sample. Group 3: IgAN, Group 4: MN, Group 5: LN.

This classification step was performed utilizing a decision tree shown on FIG. 7. The conditions for classification to groups are also listed below (Group 3: IgAN, Group 4: MN, Group 5: LN):

group is Group: 3 [0.67 0.33 0.00] when
P02787 is 8.4e+10 to 2.5e+11
P02763>=4.0e+10
P02768 is 8.7e+11 to 1.7e+12
group is Group: 3 [0.82 0.12 0.06] when
P02787>=8.4e+10
P02763<4.0e+10
group is Group: 3 [0.83 0.17 0.00] when
P02787>=8.4e+10
P02763>=4.0e+10
P02768>=1.7e+12
group is Group: 4 [0.40 0.60 0.00] when
P02787<1.9e+10
P02763<1.7e+10
P01009<4.2e+09
group is Group: 4 [0.12 0.62 0.25] when
P02787>=2.5e+11
P02763>=4.0e+10
P02768 is 8.7e+11 to 1.7e+12
group is Group: 4 [0.20 0.80 0.00] when
P02787 is 1.9e+10 to 8.4e+10
P02763<1.7e+10
group is Group: 5 [0.17 0.17 0.67] when
P02787<1.9e+10
P02763<1.7e+10
P01009>=4.2e+09
group is Group: 5 [0.00 0.00 1.00] when
P02787>=8.4e+10
P02763>=4.0e+10
P02768<8.7e+11
group is Group: 5 [0.00 0.00 1.00] when
P02787<8.4e+10
P02763>=1.7e+10

An exemplary sample provided the following results:

| Protein IDs | Gene names | Relative intensities in MS for the corresponding proteins |
|---|---|---|
| P02768-1 | ALB | 6.01E+11 |
| P01009 | SERPINA1 | 5.62E+10 |
| P02787 | TF | 9.25E+10 |
| P02763 | ORM1 | 1.89E+10 |

The decision tree (FIG. 7) classifies this sample in group 3 (IgAN). After decoding the sample it is ascertained that the sample is derived from a subject diagnosed with IgAN by other means (biopsy) and showing symptoms consistent with this condition. Further treatment confirms the diagnosis based on protein markers.

An exemplary sample provided the following results:

| Protein IDs | Gene names | Relative intensities in MS for the corresponding proteins |
|---|---|---|
| P02768-1 | ALB | 9.63E+11 |
| P01009 | SERPINA1 | 2.7E+11 |
| P02787 | TF | 7.48E+10 |
| P02763 | ORM1 | 9.12E+10 |

The decision tree (FIG. 7) classifies this sample in group 5 (LN). After decoding the sample it is ascertained that the sample is derived from a subject diagnosed with LN by other means (biopsy) and showing symptoms consistent with this condition. Further treatment confirms the diagnosis based on protein markers.

The invention claimed is:

1. A method of diagnosis of a chronic kidney disease (CKD) or glomerulopathy in a subject, comprising the following steps:
(a) determination of the level of at least three or four or five protein markers selected from the group consisting of serum albumin (ALB), alpha-1-antitrypsin (serpina1), alpha-1-acid glycoprotein 1 (ORM1), serotransferrin (TF) and trefoil factor 1 (TFF), wherein said markers also comprise the non-full-length fragments thereof, in a urine sample from said subject, and
(b) assigning a probability of the subject having or being at a risk of chronic kidney disease or glomerulopathy or not having nor being at a risk thereof based on the results of the assay of step (a), wherein this involves estimating a probability of the subject having or being at a risk of chronic kidney disease or glomerulopathy or not having nor being at a risk thereof based on the level of each of the marker levels determined in (a), the probability being estimated based on the levels of each of the markers as determined in subjects known to suffer from a glomerulopathy or a chronic kidney disease; and determining the probability of the subject, providing the urine sample tested in step (a), having or being at a risk of a glomerulopathy or a chronic kidney disease or not having nor being at a risk thereof as a product of the corresponding probabilities obtained from each marker, wherein the probability of the subject having or being at a risk of chronic kidney disease or glomerulopathy is assigned in step (b) using the following formula:

$$p(\text{disease}) = \frac{\exp(E)}{(1+\exp(E))}$$

wherein $E = 17.204550857965 - 5.75799550569336 * 10^{-10} * x_1 - 9.37976121221068 * 10^{-9} * x_2 + 1.32966288022553 * 10^{-8} * x_3 + 2.5638225555611 * 10^{-8} * x_4 + 4.03113433888467 * 10^{-7} * x_5$, wherein $x_1$ is the determined level for serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); and $x_5$ is the determined level for Trefoil factor 1 (TFF1).

2. The method of claim 1, wherein the level of said markers in step (a) is determined by mass spectrometry (MS).

3. The method of claim 1, wherein step (a) involves measurement of the level of all five protein markers serum albumin (ALB), alpha-1-antitrypsin (serpina1), alpha-1-acid glycoprotein 1 (ORM1), serotransferrin (TF) and trefoil factor 1 (TFF).

4. The method of claim 1, wherein the method further involves classification of the analysed sample as derived from a subject having or being at a risk of a particular glomerulopathy, the classification involving the following steps:
(c) determining the probability of the subject having or being at a risk of a particular glomerulopathy based on the level of a first marker one of the markers determined in step (a), the probability being estimated based on the levels of said first marker determined in subjects known to have the particular glomerulopathy;
(d) determining the probability of the patient having or being at a risk of a particular glomerulopathy based on the level of at least one another marker of the markers determined in step (a), the probability being estimated based on the levels of said at least one another marker determined in subjects known to have the particular glomerulopathy; and
(e) classifying the sample as derived form a subject having or being at a risk of a particular glomerulopathy based on results from the preceding steps.

5. The method of claim 4, wherein the particular glomerulopathy is selected from the group consisting of IgAN, membranous nephropathy (MN) or lupus nephritis (LN).

6. A method of monitoring a response to treatment of a chronic kidney disease (CKD) or glomerulopathy in a subject, comprising the following steps:

(a) measurement of the level, at a first point in time, for three or four or five of the markers selected from a group consisting of serum albumin (ALB), alpha-1-antitrypsin (serpina1), alpha-1-acid glycoprotein 1 (ORM1), serotransferrin (TF) and trefoil factor 1 (TFF), wherein said markers also comprise the non-full-length fragments thereof, in a urine sample from a subject;
(b) repeating the assay of step (a) at a later point in time after a period wherein the subject was undergoing a treatment; and
(c) assessing a response to said treatment by comparing the results of the assays of steps (a) and (b), wherein lower marker levels after treatment are indicative of a positive response to treatment,
wherein step c) involves assigning a probability of the subject having or being at a risk of chronic kidney disease or glomerulopathy based on the results of the assay for the results of steps (a) and (b), and
wherein the probability of the subject having or being at a risk of chronic kidney disease or glomerulopathy is assigned in step (b) using the following formula:

$$p(\text{disease}) = \frac{\exp(E)}{(1+\exp(E))}$$

wherein $E = 17.204550857965 - 5.75799550569336 * 10^{-10} * x_1 - 9.37976121221068 * 10^{-9} * x_2 + 1.32966288022553 * 10^{-8} * x_3 + 2.5638225555611 * 10^{-8} * x_4 + 4.03113433888467 * 10^{-7} * x_5$, and wherein $x_1$ is the determined level for serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); and $x_5$ is the determined level for Trefoil factor 1 (TFF1).

7. The method of claim 6, wherein the level of said markers in step) and (b) is determined by mass spectrometry (MS).

8. The method of claim 6, further comprising assessing a response to said treatment by comparing the results of probability for steps (a) and (b).

9. A method of treatment of a chronic kidney disease (CKD) or glomerulopathy in a subject, comprising the following steps:
(a) determination of the level of at least three or four or five protein markers selected from the group consisting of serum albumin (ALB), alpha-1-antitrypsin (serpina1), alpha-1-acid glycoprotein 1 (ORM1), serotransferrin (TF) and trefoil factor 1 (TFF), wherein said markers also comprise the non-full-length fragments thereof, in a urine sample from said subject;
(b) assigning a probability of the subject having or being at a risk of chronic kidney disease or glomerulopathy based on the results of the assay of step (a); and
(c) administering treatment against a chronic kidney disease (CKD) or glomerulopathy in the subject evaluated in step (b) as having or being at a risk of chronic kidney disease or glomerulopathy,
wherein a probability of the subject having or being at a risk of chronic kidney disease or glomerulopathy is assigned in step (b) using the following formula:

$$p(\text{disease}) = \frac{\exp(E)}{(1+\exp(E))}$$

wherein $E=17.204550857965-5.75799550569336*10^{-10}*x_1-9.37976121221068*10^{-9}*X_2+1.32966288022553*10^{-8}*x_3+2.5638225555611*10^{-8}*x_4+4.03113433888467*10^{-7}*x_5$, and wherein $x_1$ is the determined level for serum albumin (ALB); $x_2$ is the determined level for alpha-1-antitrypsin (serpina1); $x_3$ is the determined level for alpha-1-acid glycoprotein 1 (ORM1); $x_4$ is the determined level for serotransferrin (TF); $x_5$ is the determined level for Trefoil factor 1 (TFF1).

10. The method of treatment of claim 9, wherein the presence of the abovementioned markers in the urine sample is determined in step (a) by mass spectrometry (MS).

11. The method of treatment of claim 9, wherein step (a) involves determination of the level of all five protein markers serum albumin (ALB), alpha-1-antitrypsin (serpina1), alpha-1-acid glycoprotein 1 (ORM1), serotransferrin (TF) and trefoil factor 1 (TFF).

* * * * *